United States Patent
Kitaura et al.

(10) Patent No.: US 9,740,661 B2
(45) Date of Patent: Aug. 22, 2017

(54) PHYSICAL QUANTITY MEASURING APPARATUS AND PHYSICAL QUANTITY MEASURING METHOD

(71) Applicant: Asahi Kasei Microdevices Corporation, Tokyo (JP)

(72) Inventors: Munehiro Kitaura, Tokyo (JP); Norihiko Mikoshiba, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 900 days.

(21) Appl. No.: 13/756,907

(22) Filed: Feb. 1, 2013

(65) Prior Publication Data
US 2013/0204568 A1   Aug. 8, 2013

Related U.S. Application Data

(60) Provisional application No. 61/657,103, filed on Jun. 8, 2012.

(30) Foreign Application Priority Data

Feb. 2, 2012  (JP) ................................ 2012-020652
Nov. 29, 2012 (JP) ................................ 2012-260847

(51) Int. Cl.
*G01B 21/04* (2006.01)
*G06F 17/00* (2006.01)
(Continued)

(52) U.S. Cl.
CPC ............. *G06F 17/00* (2013.01); *G01D 3/032* (2013.01); *G10L 21/0208* (2013.01)

(58) Field of Classification Search
CPC .... G01D 3/022; G01D 3/0365; G01D 18/008; G01R 1/00; G01R 19/2509;
(Continued)

(56) References Cited

U.S. PATENT DOCUMENTS 5,062,062 A * 10/1991 Nishibe ................. G01D 3/022
                                                        702/41
5,255,202 A * 10/1993 Kido ....................... G01R 19/25
                                                        702/190
(Continued)

FOREIGN PATENT DOCUMENTS

JP       11-108751 A     4/1999
JP       2007-124678     5/2007
(Continued)

OTHER PUBLICATIONS

International Preliminary Report on Patentability dated Aug. 14, 2014, for the corresponding International application No. PCT/JP2013/000159.

(Continued)

*Primary Examiner* — Toan Le
*Assistant Examiner* — Jeffrey Aiello
(74) *Attorney, Agent, or Firm* — Morgan, Lewis & Bockius LLP

(57) ABSTRACT

A physical quantity measuring apparatus of the present invention measures a physical quantity from a signal based on a physical quantity output by a physical quantity signal output apparatus. A correction signal output unit outputs a new correction signal based on a signal on the basis of a physical quantity obtained at a given measurement time, a correction signal obtained before that measurement time, and a filter coefficient. A large/small relationship determining unit determines a large/small relationship between the signal on the basis of the physical quantity and the correction signal obtained before that measurement time. A first filter coefficient output unit outputs a first filter coefficient based on the plural large/small relationships.

20 Claims, 12 Drawing Sheets

(51) Int. Cl.
*G01D 3/032* (2006.01)
*G10L 21/0208* (2013.01)

(58) Field of Classification Search
CPC .... G01R 31/3651; G01C 19/5776; G01C 17/38; G01C 21/165; H03H 21/0012
USPC ........ 702/340, 341, 374, 73, 177, 320, 104, 702/183, 189, 85; 375/232, 233, 346; 381/71.11
See application file for complete search history.

(56) References Cited

U.S. PATENT DOCUMENTS

| | | | | |
|---|---|---|---|---|
| 5,386,472 | A * | 1/1995 | Pfaff | F01N 1/065 381/71.12 |
| 5,402,669 | A * | 4/1995 | Pla | H04R 29/006 367/13 |
| 6,064,494 | A * | 5/2000 | Hirota | H04N 1/3935 358/1.9 |
| 6,271,484 | B1 * | 8/2001 | Tokutsu | G01G 3/1414 177/185 |
| 7,328,105 | B1 | 2/2008 | Goslee et al. | |
| 8,831,083 | B2 * | 9/2014 | Kono | H04B 3/10 375/229 |
| 2003/0072362 | A1 * | 4/2003 | Awad | H03H 21/0012 375/232 |
| 2003/0115232 | A1 | 6/2003 | Lipp | |
| 2004/0071206 | A1 * | 4/2004 | Takatsu | H03H 21/0012 375/232 |
| 2004/0174930 | A1 | 9/2004 | Kondo et al. | |
| 2007/0046786 | A1 * | 3/2007 | Tokuyama | H04N 9/045 348/222.1 |
| 2009/0181637 | A1 * | 7/2009 | Mueller-Weinfurtner | H04L 25/0202 455/334 |
| 2009/0183567 | A1 * | 7/2009 | Fukushima | A63F 13/06 73/504.02 |
| 2010/0009761 | A1 * | 1/2010 | Ohta | H03M 1/12 463/43 |
| 2010/0031097 | A1 * | 2/2010 | Seo | G01D 5/24452 714/709 |
| 2010/0060296 | A1 * | 3/2010 | Jiang | G01D 18/00 324/613 |
| 2010/0176976 | A1 * | 7/2010 | Breems | H03M 3/386 341/120 |
| 2011/0098582 | A1 * | 4/2011 | Takahashi | A61B 5/024 600/500 |
| 2011/0222698 | A1 * | 9/2011 | Asao | G10K 11/1784 381/71.1 |
| 2011/0257906 | A1 * | 10/2011 | Scherrer | G01D 1/16 702/48 |
| 2012/0109586 | A1 * | 5/2012 | Hao | G01D 1/00 702/195 |
| 2014/0036983 | A1 * | 2/2014 | Ito | H04L 25/0212 375/232 |

FOREIGN PATENT DOCUMENTS

| | | |
|---|---|---|
| JP | 2008-164514 | 7/2008 |
| JP | 2010-019751 A | 1/2010 |

OTHER PUBLICATIONS

International Search Report from WO2013/114797A dated Apr. 2, 2013 for corresponding International Application No. PCT/JP2013/000159.
European Search Report issued in European Patent Application No. 13 744 332.1 on Oct. 20, 2015.
Giovanna Capizzi et al: "An Adaptive Exponentially Weighted Moving Average Control Chart", Technometrics., vol. 45, No. 3, Aug. 31, 2003 (Aug. 31, 2003), pp. 199-207.
Zhang Wu et al: "A loss function-based adaptive control chart for monitoring the process mean and variance", The International Journal of Advanced Manufacturing Technology, Springer, Berlin, DE, vol. 40, No. 9-10, Feb. 13, 2008 (Feb. 13, 2008), pp. 948-959.
Demetrios L. Antzoulakos et al: "The Modified r Out of m Control Chart", Communications in Statistics, Simulation and Computation., vol. 37, No. 2, Feb. 5, 2008 (Feb. 5, 2008), pp. 396-408.

* cited by examiner

FIRST EMBODIMENT: UTILIZE ONLY FIRST FILTER COEFFICIENT

SECOND EMBODIMENT: UTILIZE BOTH FIRST AND SECOND FILTER COEFFICIENTS

FIRST COMPARATIVE EXAMPLE

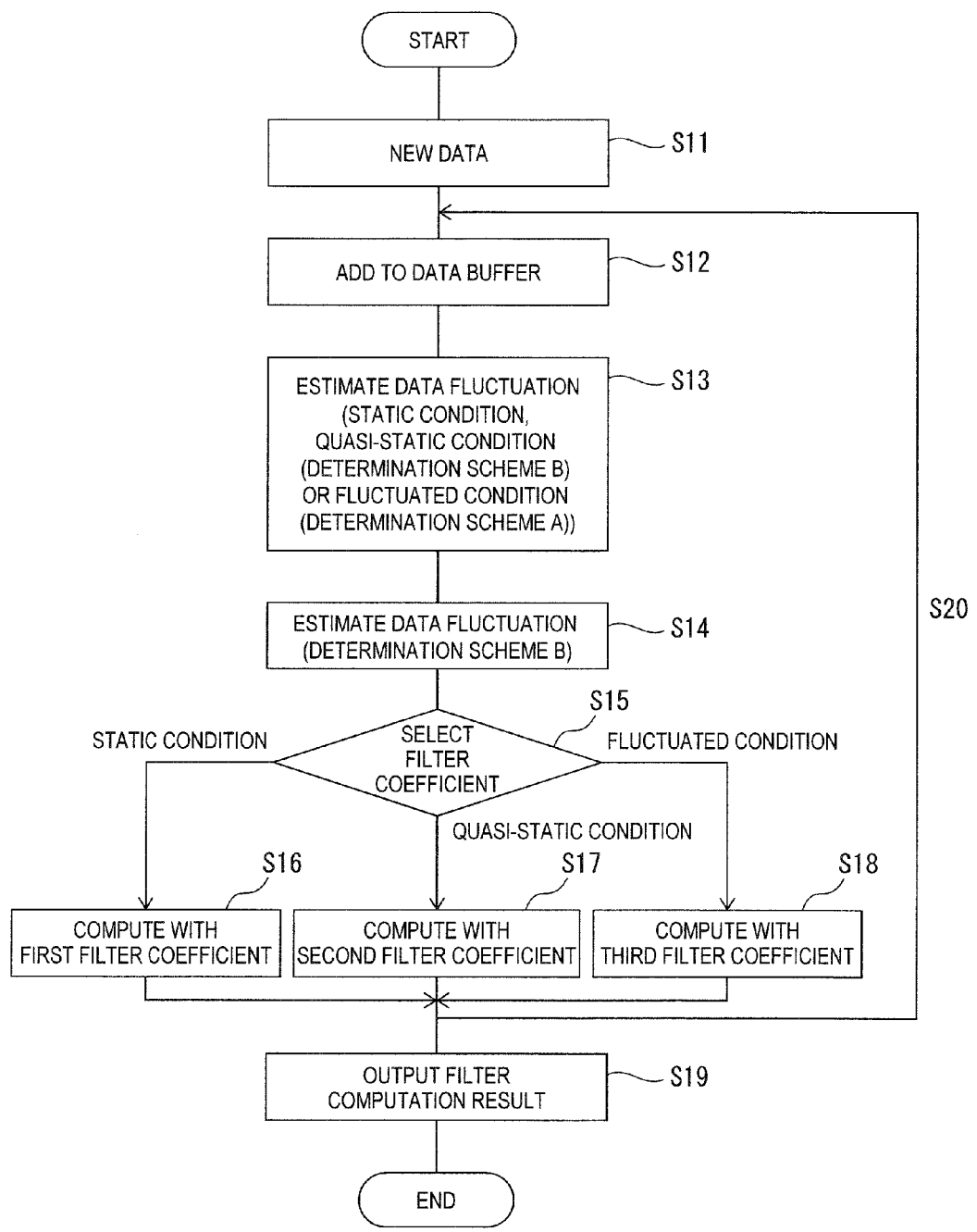

REFERENCE EXAMPLE: ONLY DETERMINATION SCHEME A

THIRD EMBODIMENT: DETERMINE FLUCTUATION IN CORRECTION VALUE,
UTILIZE BOTH DETERMINATION SCHEMES A AND B

THIRD EMBODIMENT: DETERMINE FLUCTUATION IN MEASURED VALUE, UTLIZE BOTH DETERMINATION SCHEMES A AND B

PHYSICAL QUANTITY MEASURING APPARATUS AND PHYSICAL QUANTITY MEASURING METHOD

TECHNICAL FIELD

The present invention relates to a physical quantity measuring apparatus and a physical quantity measuring method, and more specifically, to a physical quantity measuring apparatus and a physical quantity measuring method which measure a physical quantity from a signal based on a physical quantity output by a physical quantity signal output apparatus. In particular, the present invention can be suitably applied to an electronic compass.

BACKGROUND ART

Generally as example physical quantity measuring apparatuses a speed sensor, an acceleration sensor, an angular speed sensor, a magnetic sensor, a geomagnetic sensor, an azimuth sensor, an electronic compass, a temperature sensor, and a pressure sensor are well known. Respective sensors perform a predetermined signal processing on a signal based on a physical quantity output by a physical quantity signal output apparatus for obtaining information from the exterior, thereby measuring a target physical quantity. Microphones are also sensors that detect sound, i.e., vibrations of air, and are included in the physical quantity measuring apparatuses.

Signals output by the physical quantity signal output apparatus may include noise signals non-related to a target physical quantity. Hence, by performing a correction of reducing noise signals from a signal output by the physical quantity signal output apparatus, a target physical quantity can be further highly precisely measured. An example method of eliminating noise signals from the signal output by the physical quantity signal output apparatus is updating a coefficient of a first filter based on an output signal by a second filter having a faster speed than that of the first filter.

FIG. 1 is a block diagram for explaining a conventional physical quantity measuring apparatus which is disclosed in FIG. 12 of Patent Document 1. A physical quantity measuring apparatus disclosed in Patent Document 1 relates to a signal processing apparatus applied to a microphone array processing apparatus which suppresses disturbance noises using a microphone array for inputting a speech in a speech recognition apparatus or a television conference apparatus, etc., and which extracts a speech represented by a target signal. A first adaptive filter 1 includes a filter unit 11-1 that performs a filter computation on a reference signal x to obtain an output signal y1, a subtractor 12-1 that subtracts the output signal by the filter unit 11-1 from a desired response d to obtain an error signal e1, and an adaptive mode control unit 14-1 and a filter update computing unit 15-1 which update the filter coefficient of the filter unit 11-1 based on the reference signal x and the error signal e1. The output signal by the first adaptive filter 1 is taken as an output by the signal processing apparatus.

Moreover, a second adaptive filter 2 employs an adaptive filter configuration based on a typical NLMS algorithm, and includes a filter unit 11-2 that performs a filter computation on the reference signal x to obtain an output signal y2, a subtractor 12-2 that subtracts the output signal y2 by the filter unit 11-2 from the desired response d to obtain an error signal e2, and a filter update computing unit 15-2 that performs a computation of a filter update based on the reference signal x and the error signal e.

The second adaptive filter 2 has an adaptive speed set to be faster than that of the first adaptive filter 1, and the adaptive mode control unit 14-1 controls the adaptive speed of the first adaptive filter based on the output signal power by the second adaptive filter 2.

According to such a configuration, a signal processing apparatus can be realized which utilizes an adaptive filter that surely enables an adaptive operation without causing the target signal to be distorted and performing an adaptive operation on background noises.

Patent document 2 discloses an azimuth information apparatus, and includes a three-dimensional magnetic sensor and posture data corresponding to a posture of the magnetic sensor. This apparatus selects the smoothing intensity of a smoothing filter that performs smoothing on data of an azimuth angle derived from magnetic sensor data and the posture data based on the posture data at a time when the magnetic sensor data is obtained.

Patent Document 3 also discloses an azimuth information apparatus and an electronic compass which selects an algorithm for an azimuth calculation based on information on a geomagnetic intensity obtained right before and information on a current geomagnetic intensity, or azimuth information obtained right before and current azimuth information, thereby reducing the effect of magnetic noises.

PRIOR ART DOCUMENTS

Patent Documents

Patent Document 1: JP 2007-124678 A
Patent Document 2: JP 2008-164514 A
Patent Document 3: U.S. Pat. No. 7,328,105, specification (B1)

SUMMARY OF THE INVENTION

Problem to be Solved

According to the signal processing apparatus disclosed in Patent Document 1 and utilizing the adaptive filter, however, a configuration is employed which controls the adaptive mode of the first adaptive filter for obtaining a system output based on an output power obtained as a result of the filter update computation by the second adaptive filter, a time necessary for adapting the second adaptive filter in addition to a time for adaptation of the first adaptive filter is necessary, and thus the responsiveness remarkably decreases when a signal suddenly and keenly changes.

According to Patent Document 2, the smoothing intensity of the smoothing filter for azimuth angle data is selected depending on the posture of the magnetic sensor, it may necessary to increase the smoothing intensity depending on the posture, and thus it takes a time for a signal processing and the responsiveness remarkably decreases when a signal suddenly and keenly changes.

Furthermore, according to Patent Document 3, when the geomagnetic intensity is small, a higher value of the smoothing intensity is selected for suppressing noises, and thus the responsiveness of the filter remarkably decreases when a signal suddenly and keenly changes. Moreover, when the direction of the magnetic sensor slowly but successively changes, i.e., when a situation in which a difference between azimuth information obtained right before and current azimuth information is small continuously occurs, it may be determined that there is no change in the azimuth information, and the smoothing intensity is fixed to be a higher value. This results in a poor azimuth tracking, and an observation includes an error in an azimuth angle.

That is, when noise signals are eliminated from a signal output by the physical quantity signal output apparatus, if all noises are sequentially and completely eliminated, it becomes possible to highly precisely measure a target physical quantity, but it also brings about the reduction of the responsiveness.

The present invention has been made in view of the above-explained circumstances, and it is an object of the present invention to provide a physical quantity measuring apparatus and a physical quantity measuring method which have a good responsiveness and which efficiently eliminate noise components in a signal output by a physical quantity signal output apparatus to enable a highly precise physical quantity measurement.

Solution to the Problem

Inventors of the present invention keenly studied and found that the above-explained disadvantages can be addressed by the present invention relating to a physical quantity measuring apparatus and a physical quantity measuring method employing the following structures, and have completed the present invention.

The present invention has been made in order to accomplish the above object, and according to the present invention set forth in claim 1, there is provided a physical quantity measuring apparatus (20, 40, 60) including a physical quantity computing apparatus (22, 42, 62) that computes a physical quantity from a signal based on a physical quantity and output by a physical quantity signal output apparatus (21, 41, 61), the physical quantity computing apparatus (62) includes: a fluctuation estimating unit (71a) that estimates a fluctuation in a physical quantity detected by the physical quantity signal output apparatus (61); a filter coefficient output unit (71b) which sets a filter coefficient based on the fluctuation estimated by the fluctuation estimating unit (71a), and which outputs the filter coefficient; and a correction signal output unit (73) that outputs, based on the filter coefficient output by the filter coefficient output unit (71b) and an output value by the physical quantity signal output apparatus (61), a correction value of the output value (see FIG. 9).

According to the present invention set forth in claim 2, in the present invention set forth in claim 1, the fluctuation estimating unit (71a) includes: a first fluctuation estimating unit that estimates a fluctuation in the physical quantity based on a distribution status of physical quantities obtained at multiple measurement times; and a second fluctuation estimating unit that estimates a fluctuation in the physical quantity based on a signal on a basis of a physical quantity obtained at a given measurement time and a signal on a basis of a physical quantity obtained at a measurement time close to the former measurement time, and the filter coefficient output unit (71b) sets the filter coefficient based on the fluctuation in the physical quantity estimated by the first fluctuation estimating unit or the second fluctuation estimating unit, and outputs the filter coefficient.

According to the present invention set forth in claim 3, in the present invention set forth in claim 2, the second fluctuation estimating unit includes a fluctuation determining unit that determines whether or not the fluctuation in the physical quantity is smaller than a predetermined threshold, and the first fluctuation estimating unit estimates the fluctuation in the physical quantity based on the distribution status of physical quantities obtained at the multiple measurement times based on a determination result by the fluctuation determining unit (71a).

According to the present invention set forth in claim 4, in the present invention set forth in claim 2 or 3, the filter coefficient output unit (71b) includes: a first filter coefficient output unit (32, 52) that outputs a first filter coefficient based on the first fluctuation estimating unit; a second filter coefficient output unit (55) that outputs a second filter coefficient based on the second fluctuation estimating unit; and a filter coefficient selecting unit (56) that selects either one of the first and second filter coefficients as the filter coefficient.

According to the present invention set forth in claim 5, in the present invention set forth in claim 1, the correction signal output unit (73) outputs a new correction signal based on a signal on a basis of a physical quantity obtained at a given measurement time, a correction signal obtained before the measurement time, and the filter coefficient, the fluctuation estimating unit (71a) includes a large/small relationship determining unit (51) that determines a large/small relationship between the signal based on the physical quantity and the correction signal obtained before the measurement time, and the filter coefficient output unit (71b) includes a first filter coefficient output unit (32, 52) that outputs a first filter coefficient based on the plural large/small relationships.

According to the present invention set forth in claim 6, the present invention set forth in claim 5 further includes: a difference value calculating unit (54) that calculates a difference value between a signal based on a physical quantity obtained at a given measurement time and a correction signal obtained before the measurement time or a difference value between correction signals obtained at different timings from each other and obtained before the measurement time; a second filter coefficient output unit (55) that outputs a second filter coefficient based on the difference value calculated by the difference value calculating unit (54); and a filter coefficient selecting unit (56) that selects either one of the first and second filter coefficients as the filter coefficient.

According to the present invention set forth in claim 7, in the present invention set forth in claim 5 or 6, when in the desired cycle, the large/small relationship between the signal based on the physical quantity and the correction signal is relatively deviated to either large or small, the first filter coefficient output unit (32, 52) outputs, as the first filter coefficient, a coefficient that increases a contribution of the signal based on the physical quantity to the new correction signal, and when there is no relative deviation in the large/small relationship between the signal based on the physical quantity and the correction signal, the first filter coefficient output unit outputs, as the first filter coefficient, a coefficient that increases a contribution of the correction signal to the new correction signal.

According to the present invention set forth in claim 8, in the present invention set forth in claim 6 or 7, the second filter coefficient output unit (55) outputs the second filter coefficient based on a difference value between a signal on a basis of the physical quantity obtained at a given measurement time and a correction signal obtained right before the measurement time, and a difference value between a signal on a basis of the physical quantity obtained at a given measurement time and a correction signal obtained two time points before the measurement time.

According to the present invention set forth in claim 9, in the present invention set forth in claim 6, 7 or 8, when the difference value between the signal based on the physical quantity and the correction signal or the difference value between different correction signals from each other is relatively large, the second filter coefficient output unit (55) outputs, as the second filter coefficient, a coefficient that increases a contribution of the signal based on the physical quantity to the new correction signal, and when the difference value between the signal based on the physical quantity and the correction signal or the difference value between different correction signals from each other is relatively small, the second filter coefficient output unit outputs, as the second filter coefficient, a coefficient that increases a contribution of the correction signal to the new correction signal.

According to the present invention set forth in claim 10, in the present invention set forth in any one of claims 6 to 9, the filter coefficient selecting unit (56) selects either one of the first and second filter coefficients that further increases the contribution of the signal based on the physical quantity to the new correction signal.

According to the present invention set forth in claim 11, in the present invention set forth in any one of claims 6 to 10, the correction signal output unit (33, 53, 73) outputs the new correction signal through a relational expression indicated by a formula (1):

$$Snew = a \times Sin + (1-a) \times Sold \quad (1),\text{ and}$$

the filter coefficient selecting unit selects the filter coefficient through a relational expression indicated by a formula (2):

$$a = \max(a1, a2) \quad (2)$$

where Snew is new correction signal, Sin is a signal based on a physical quantity, Sold is a correction signal, a is a coefficient selected by the filter coefficient selecting unit, a1 is a first filter coefficient, and a2 is a second filter coefficient.

According to the present invention set forth in claim 12, in the present invention set forth in any one of claims 1 to 11, the physical quantity signal output apparatus (21, 41, 61) includes a physical quantity measuring element that outputs a physical quantity signal necessary for measuring a target physical quantity.

According to the present invention set forth in claim 13, there is provided a physical quantity measuring method of measuring a physical quantity from a signal based on a physical quantity output by a physical quantity signal output apparatus, the method including: a detection step for detecting a signal based on a physical quantity through a detecting unit; a fluctuation estimating step for estimating a fluctuation in the physical quantity detected in the detection step through a fluctuation estimating unit; a filter coefficient output step for setting a filter coefficient based on the fluctuation estimated in the fluctuation estimating step, and outputting the filter coefficient through a filter coefficient output unit; and a correction signal output step for outputting, based on the filter coefficient output through the filter coefficient output step and an output value output by the detecting unit, a correction value of the output value through a correction signal output unit.

According to the present invention set forth in claim 14, in the present invention set forth in claim 13, the fluctuation estimating step includes: a first fluctuation estimating step for estimating a fluctuation in the physical quantity based on a distributed status of physical quantities obtained at multiple measurement times; and a second fluctuation estimating step for estimating a fluctuation in the physical quantity based on a signal on a basis of a physical quantity obtained at a given measurement time and a signal on a basis of a physical quantity obtained at a measurement time close to the former measurement time, and the filter coefficient output step sets the filter coefficient based on the fluctuation in the physical quantity estimated through the first fluctuation estimating step or the second fluctuation estimating step, and outputs the filter coefficient.

According to the present invention set forth in claim 15, in the present invention set forth in claim 14, the second fluctuation estimating step includes a fluctuation determining step for determining whether or not the fluctuation in the physical quantity is smaller than a predetermined threshold, and the first fluctuation estimating step estimates the fluctuation in the physical quantity based on the distribution status of physical quantities obtained at the multiple measurement times and based on a determination result through the fluctuation determining step.

According to the present invention set forth in claim 16, in the present invention set forth in claim 14 or 15, the filter coefficient output step includes: a first filter coefficient output step for outputting a first filter coefficient based on the first fluctuation estimating step; a second filter coefficient output step for outputting a second filter coefficient based on the second fluctuation estimating step; and a filter coefficient selecting step for selecting either one of the first and second filter coefficients as the filter coefficient.

According to the present invention set forth in claim 17, in the present invention set forth in claim 13, the correction signal output step outputs a new correction signal based on a signal on a basis of a physical quantity obtained at a given measurement time, a correction signal obtained before the measurement time, and the filter coefficient, the fluctuation estimating step includes a large/small relationship determining step for determining a large/small relationship between the signal on the basis of the physical quantity and the correction signal obtained before the measurement time, and the filter coefficient output step includes a first filter coefficient output step for outputting a first filter coefficient based on the plural large/small relationships.

According to the present invention set forth in claim 18, the present invention set forth in claim 17 further includes in addition to the large/small relationship determining step for determining the large/small relationship between the signal on the basis of the physical quantity and the correction signal and the first filter coefficient output step for outputting the first filter coefficient based on the plurality of large/small relationships: a difference value calculating step for calculating a difference value between the signal on the basis of the physical quantity and the correction signal or a difference value between correction signals obtained at different timings from each other; a second filter coefficient output step for outputting a second filter coefficient based on the difference value; and a filter coefficient selecting step for selecting either one of the first and second filter coefficients as the filter coefficient to obtain the filter coefficient.

According to the present invention set forth in claim 19, in the present invention set forth in claim 17 or 18, when in the desired cycle, the large/small relationship between the signal based on the physical quantity and the correction signal is relatively deviated to either large or small, the first filter coefficient output step is a step for outputting, as the first filter coefficient, a coefficient that increases a contribution of the signal based on the physical quantity to the new correction signal, and when there is no relative deviation in the large/small relationship between the signal based on the physical quantity and the correction signal, the first filter coefficient output step is a step for outputting, as the first filter coefficient, a coefficient that increases a contribution of the correction signal to the new correction signal.

According to the present invention set forth in claim 20, in the present invention set forth in claim 18 or 19, the second filter coefficient output step is a step for outputting the second filter coefficient based on a difference value between a signal on a basis of the physical quantity obtained at a given measurement time and a correction signal obtained right before the measurement time, and a difference value between a signal on a basis of the physical quantity obtained at a given measurement time and a correction signal obtained two time points before the measurement time.

According to the present invention set forth in claim 21, in the present invention set forth in claim 18, 19, or 20, when the difference value between the signal based on the physical quantity and the correction signal or the difference value between different correction signals from each other is relatively large, the second filter coefficient output step is a step for outputting, as the second filter coefficient, a coefficient that increases a contribution of the signal based on the physical quantity to the new correction signal, and when the difference value between the signal based on the physical quantity and the correction signal or the difference value between different correction signals from each other is relatively small, the second filter coefficient output step is a step for outputting, as the second filter coefficient, a coefficient that increases a contribution of the correction signal to the new correction signal.

According to the present invention set forth in claim 22, in the present invention set forth in any one of claims 18 to 21, the filter coefficient selecting step is a step for selecting either one of the first and second filter coefficients that further increases the contribution of the signal based on the physical quantity to the new correction signal.

According to the present invention set forth in claim 23, in the present invention set forth in any one of claims 18 to 22, the correction signal output step is a step for outputting the new correction signal through a relational expression indicated by a formula (3):

$$Snew = a \times Sin + (1-a) \times Sold \quad (3), \text{ and}$$

the filter coefficient selecting unit is a step for selecting the filter coefficient through a relational expression indicated by a formula (4):

$$a = \max(a1, a2) \quad (4)$$

where Snew is new correction signal, Sin is a signal based on a physical quantity, Sold is a correction signal, a is a coefficient selected by the filter coefficient selecting unit, a1 is a first filter coefficient, and a2 is a second filter coefficient.

According to the present invention set forth in claim 24, in the present invention set forth in any one of claims 13 to 23, a physical quantity signal output step for outputting a signal based on a physical quantity outputs a physical quantity signal necessary for measuring a target physical quantity through a physical quantity measuring element.

According to the present invention set forth in claim 25, there is provided a program that allows a computer to execute the respective computing steps according to any one of claims 13 to 24 using a physical quantity signal that is a signal output based on a physical quantity.

According to the present invention set forth in claim 26, there is provided a computer-readable non-transitory recording medium that has recorded therein a program for executing the respective computing steps according to claim 25.

Advantageous Effects of the Invention

According to the present invention, a physical quantity measuring apparatus and a physical quantity measuring method can be realized which have a good responsiveness, and which can efficiently eliminate noise components in a signal based on a physical quantity to enable a highly precise physical quantity measurement. In particular, it is applicable to an electronic compass.

BRIEF DESCRIPTION OF THE DRAWINGS

FIG. 11 is a flowchart for explaining a case in which the physical quantity measuring apparatus utilizes three kinds of filter coefficients according to the third embodiment of the present invention;

DESCRIPTION OF EMBODIMENTS

An explanation will now be given of each embodiment of the present invention with reference to the accompanying drawings.

First Embodiment

Figure 2:
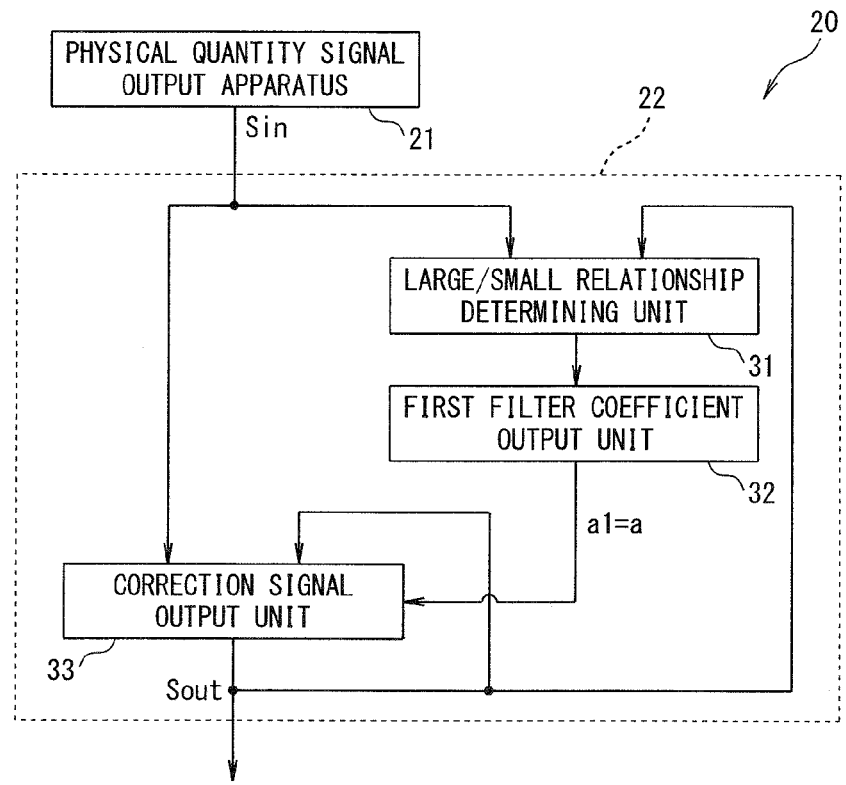
FIG. 2 is a block diagram for explaining a physical quantity measuring apparatus according to a first embodiment of the present invention.

FIG. 2 is a block diagram for explaining a physical quantity measuring apparatus according to a first embodiment of the present invention. In this figure, reference numerals 20, 21, 22, 31, 32, and 33 indicate a physical quantity measuring apparatus, a physical quantity signal output apparatus, a physical quantity calculating apparatus, a large/small relationship determining unit, a first filter coefficient output unit, and a correction signal output unit, respectively. That is, the physical quantity measuring apparatus 20 of the present invention includes the physical quantity signal output apparatus 21 and the physical quantity computing apparatus 22. The physical quantity computing apparatus 22 is connected to the physical quantity signal output apparatus 21 configuring the physical quantity measuring apparatus 20, and includes the large/small relationship determining unit 31, the first filter coefficient output unit 32, and the correction signal output unit 33. Each component may have a buffer function as needed for temporally storing information.

The physical quantity calculating apparatus of the present invention is a physical quantity calculating apparatus that measures a physical quantity from a signal based on a physical quantity output by the physical quantity signal output apparatus.

The physical quantity signal output apparatus 21 is not limited to any particular apparatus as long as it includes a physical quantity measuring element that is capable of outputting a signal based on a physical quantity (hereinafter, referred to as a physical quantity signal) necessary for measuring a target physical quantity.

Example physical quantity measuring elements applied are a hall element and a magnetoresistance effect element when a target physical quantity is magnetism, and are a mechanical acceleration sensor, an optical acceleration sensor, and a semiconductor acceleration sensor, such as a capacitance type and a piezoresistance type when the target physical quantity is acceleration.

The physical quantity signal can be a signal itself obtained from the physical quantity measuring element, a signal obtained from the physical quantity measuring element and having undergone a computation processing, such as a sensitivity correction computation, an offset correction computation, or a sign inversion computation, or a signal obtained from the physical quantity measuring element or obtained through a computation processing and further having undergone an A/D conversion.

A plurality of physical quantity measuring elements may be applied as the components of the physical quantity signal output apparatus in accordance with a measurement dimension of a target physical quantity, and in the case of, for example, a three-dimensional magnetic sensor, three physical quantity measuring elements having respective magnetism-sensitive characteristics along three different axes may be utilized as the physical quantity signal output apparatus.

When a plurality of physical quantity measuring elements are utilized, multiple large/small relationship determining units, first filter coefficient output units, and correction signal output units may be provided depending on the number of the physical quantity measuring elements, and single large/small relationship determining unit, first filter coefficient output unit, and correction signal output unit may be provided regardless of the number of the physical quantity measuring elements. Moreover, multiple difference value calculating units, second filter coefficient output units, and filter coefficient selecting units to be discussed later with reference to FIG. 4 may be provided depending on the number of the physical quantity measuring elements, or otherwise single difference value calculating unit, second filter coefficient output unit, and filter coefficient selecting unit may be provided regardless of the number of the physical quantity measuring elements.

According to the physical quantity computing apparatus of the present invention, all computation processes can be performed digitally. Hence, it is preferable that the physical quantity signal output apparatus should output a digital signal from the standpoint of low energy consumption.

The correction signal output unit 33 outputs a new correction signal Snew when a physical quantity signal Sin obtained at a given measurement time, a correction signal Sold obtained before that measurement time, and a filter coefficient a are input.

An example calculation method of the new correction signal Snew based on the physical quantity signal Sin obtained at a given measurement time, the correction signal Sold obtained before that measurement time, and the filter coefficient a is a method based on a relational expression represented by following formula (1).

$$Snew = a \times Sin + (1-a) \times Sold \quad (1)$$

(where Snew is the new correction signal, Sin is the physical quantity signal obtained at a given measurement time, Sold is the correction signal obtained before that measurement time, and a is a filter coefficient (a value from 0 to 1).

According to the formula (1), the larger the filter coefficient is, the more the correction signal Snew is affected by the physical quantity signal obtained at a given measurement time, and the smaller the filter coefficient is, the less the correction signal is affected by the physical quantity signal obtained at the given measurement time, but the more the correction signal is affected by the correction signal obtained before that measurement time (i.e., the correction signal output in past). That is, when noises are mainly derived from a fluctuation in the physical quantity signal obtained at a given measurement time, by setting a small filter coefficient, it becomes possible to reduce the fluctuation of the physical quantity due to the effect of the noises superimposed on the physical quantity signal.

The large/small relationship determining unit 31 determines the large/small relationship between the two signals that are the physical quantity signal obtained at a given measurement time and the correction signal obtained before that measurement time (hereinafter, referred to as a "large/small relationship between a physical quantity signal and a correction signal), and outputs a determination result.

The large/small relationship between two signals is information on which one of the two signals is large (is small). The correction signal obtained before a measurement time is an output correction signal obtained before a physical quantity signal is output, which is subjected to a large/small relationship determination. When, for example, the physical quantity signal is periodically input in the physical quantity computing apparatus, it is fine if the correction signal is one output at a right previous or further previous cycle.

Example output configuration of the large/small relationship determining unit 31 are a scheme of determining and outputting the large/small relationship between the physical quantity signal and each correction signal obtained at plural different measurement times at a time, or a scheme of sequentially outputting determining results on the large/small relationship between the physical quantity signal and the correction signal for respective measurement times. It is preferable that the determination result on the large/small relationship between the physical quantity signal and the correction signal should be output sequentially for respective measurement times from the standpoint of the tracking capability to a change. When the determination results on the large/small relationship are sequentially output as explained above, it is preferable that temporally storing means of the determination result on the large/small relationship should be provided.

The first filter coefficient output unit 32 outputs a first filter coefficient a1 based on the plural determination results on the large/small relationship obtained from the output by the large/small relationship determining unit. As an example, in plural measurement times, when the large/small relationship between the physical quantity signal and the correction signal relatively deviates to either large or small, a coefficient that increases the contribution of the physical quantity signal to the new correction signal is output as the first filter coefficient, and when there is no relative deviation in the large/small relationship between the physical quantity signal and the correction signal, a coefficient that decreases the contribution of the physical quantity signal to the new correction signal is output as the first filter coefficient.

Figure 3:
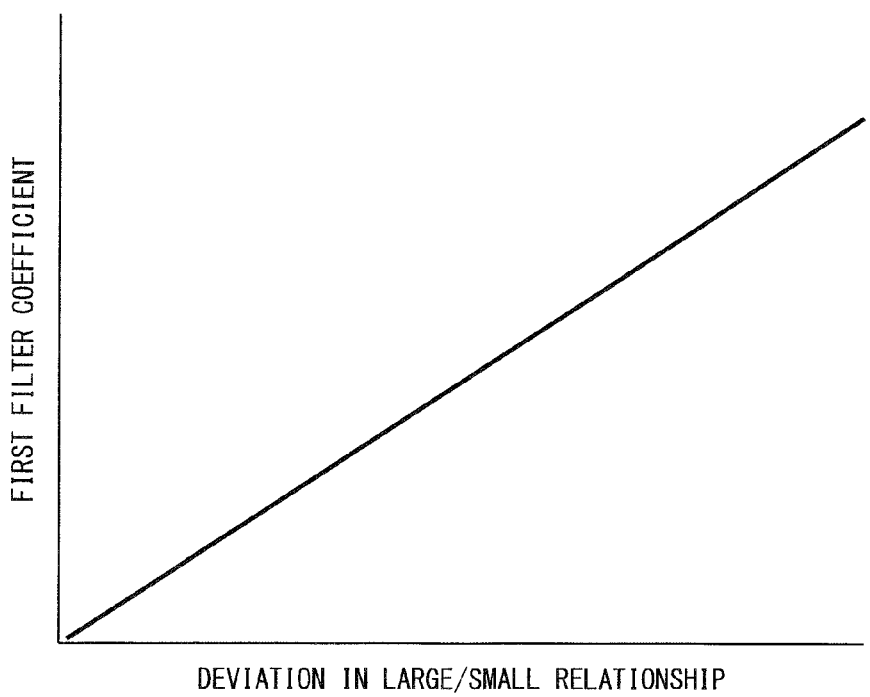
FIG. 3 is a diagram illustrating an example case in which a first filter coefficient is set based on a plurality of determination results on a large/small relationship obtained from an output by a large/small relationship determining unit.

FIG. 3 is a diagram illustrating an example case in which the first filter coefficient is set based on plural determination results on the large/small relationship obtained from the output by the large/small relationship determining unit. When the deviation in the large/small relationship is large (as a radical example, when the physical quantity signal is large or the correction signal is large in all cycles), the first filter coefficient that is a large value is output. Conversely, when the deviation in the large/small relationship is small (as a radical example, when the number of times that the physical quantity signal is large and the number of times that the correction signal is large are equal), the first filter coefficient value that is a small value is output.

A condition in which the large/small relationship between the physical quantity signal and the correction signal is deviated in either way remarkably occurs when a change is successively caused with a constant tendency, i.e., when the physical quantity to be measured itself is changing. Conversely, a condition in which there is no deviation in the large/small relationship between the physical quantity signal and the correction signal remarkably occurs when a random change is caused, i.e., when the physical quantity signal is changed by the effect of noises.

Accordingly, in the case of, for example, the new correction signal is derived through the above-explained formula (1), when the difference in the large/small relationship is large, the filter coefficient is set to be large to increase the contribution of the physical quantity signal, and when the difference in the large/small relationship is small, the filter coefficient is set to be small to decrease the contribution of the physical quantity signal. This enables an elimination of the effect of noises when the noises largely affects.

In order to set the first filter coefficient based on a digital signal, it can be realized if a table in accordance with a desired input/output characteristic is prepared. Or otherwise, it can be also realized by employing a circuit that calculates the first filter coefficient as a function of difference values.

Figure 6A:
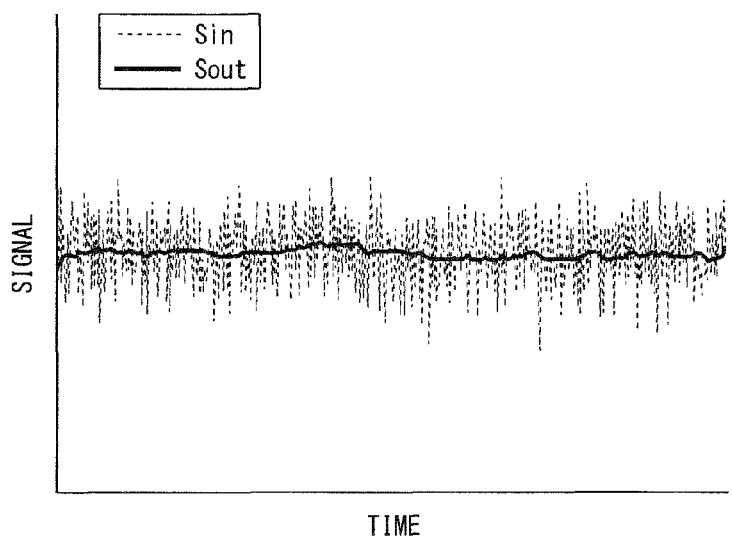
FIG. 6A is a diagram illustrating a correction signal according to the first embodiment.
Figure 6B:
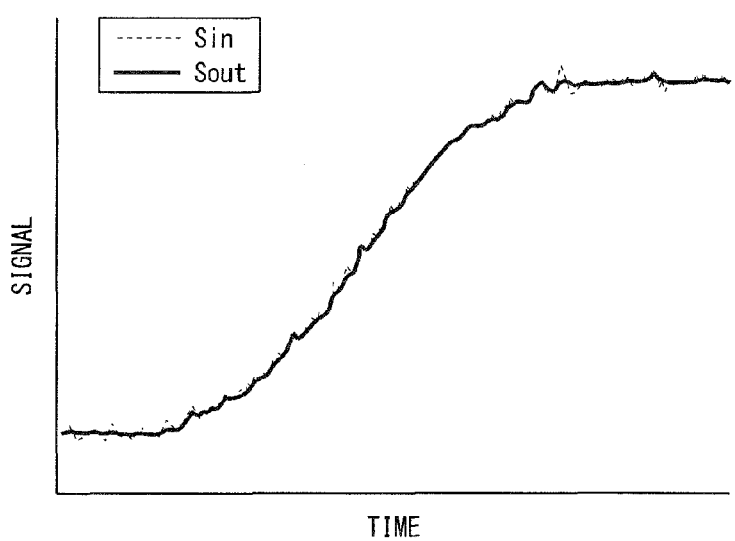
FIG. 6B is a diagram illustrating a correction signal according to the first embodiment.
Figure 6C:
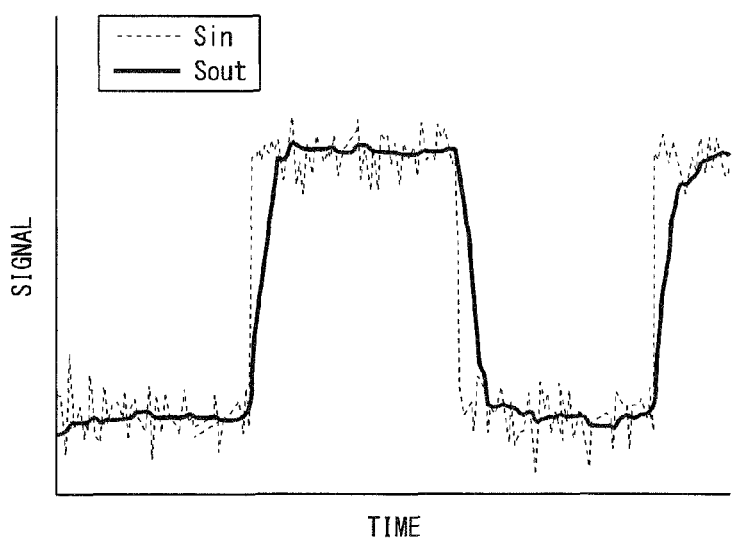
FIG. 6C is a diagram illustrating a correction signal according to the first embodiment.

In the above-explained first embodiment, as the physical quantity signal, (1) a physical quantity signal with a constant value (constant value+noises), (2) a sinusoidal physical quantity signal (sine wave+noises), and (3) rectangular physical quantity signal (rectangular wave+noises) are input in the physical quantity computing apparatus employing the configuration in FIG. 2. Correction signals (Sout) to respective inputs (Sin) are illustrated in FIGS. 6A to 6C.

(1) The correction signal to the physical quantity signal with a constant value has noise components canceled at a good level.

(2) The correction signal to the sinusoidal physical quantity signal has less noise components and has no delay to the input signal.

(3) The correction signal to the rectangular physical quantity signal has a slight delay in a region where the signal keenly changes.

Second Embodiment

Figure 1:
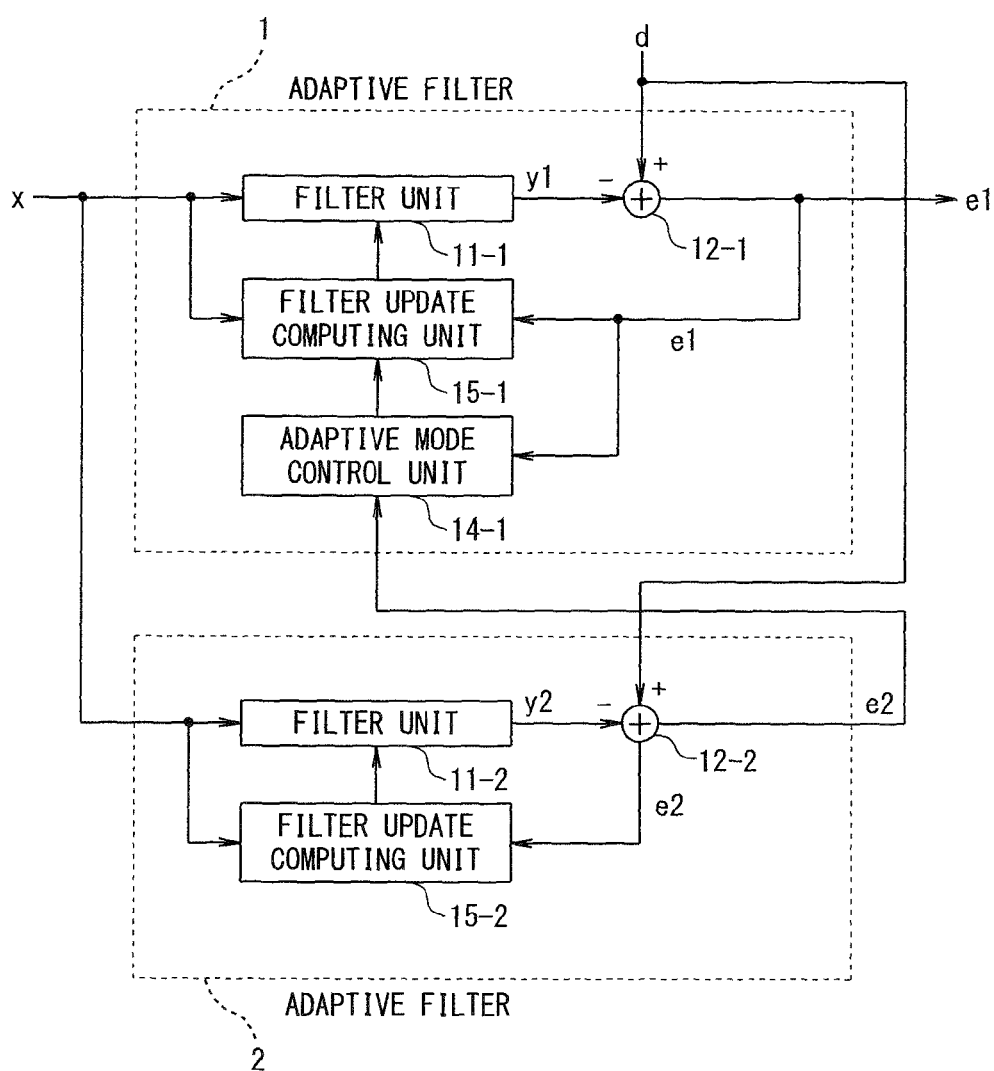
FIG. 1 is a block diagram for explaining a conventional physical quantity measuring apparatus.
Figure 4:
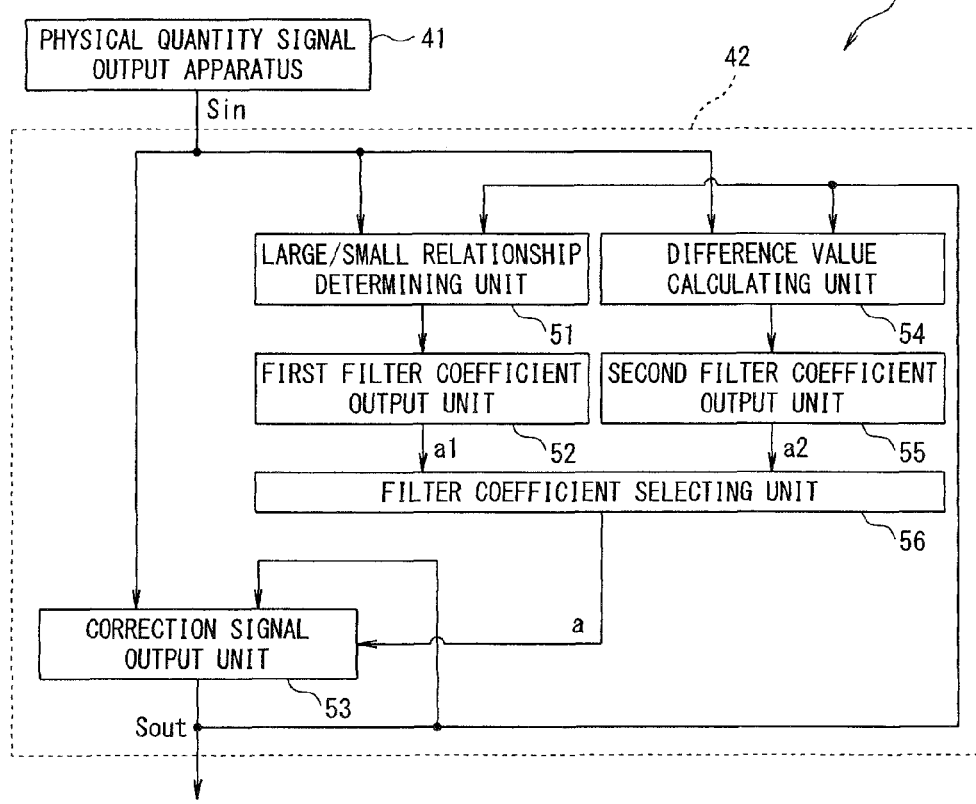
FIG. 4 is a block diagram for explaining a physical quantity measuring apparatus according to a second embodiment of the present invention.

FIG. 4 is a block diagram for explaining a physical quantity measuring apparatus according to a second embodiment of the present invention, and in this figure, reference numerals 40, 41, 42, 51, 52, 53, 54, 55, and 56 denote a physical quantity measuring apparatus, a physical quantity signal output apparatus, a physical quantity computing apparatus, a large/small relationship determining unit, a first filter coefficient output unit, a correction signal output unit, a difference value calculating unit, a second filter coefficient output unit, and a filter coefficient selecting unit, respectively. That is, in the physical quantity measuring apparatus 40 illustrated in FIG. 3, the physical quantity computing apparatus 42 configuring the physical quantity measuring apparatus 40 illustrated in FIG. 1 further includes the difference value calculating unit 54, the second filter coefficient output unit 55, and the filter coefficient selecting unit 56.

The difference value calculating unit 54 calculates a difference value between a signal based on a physical quantity measured at a given measurement time and a correction signal obtained before that measurement time, or between correction signals obtained at different timings from each other and before that measurement time. There is no particular limitation as long as it is possible to calculate a difference value between input signals. The difference value may be a value including positive/negative sign information, or may be an absolute value.

The difference value may be a difference value between a physical quantity signal measured at a given measurement time and a correction signal obtained before that measurement time, or between correction signals obtained at different timings from each other and before that measurement time. From the standpoint of the responsiveness, it is preferable that the difference value should be a difference value between a physical quantity signal obtained at a given measurement time and a correction signal output before that measurement time. From the standpoint of smoothing on the signal, it is preferable that the difference value should be a difference value between two corrections signals output at different times from each other before the measurement time at which a signal based on a physical quantity is obtained.

From the standpoint of both responsiveness and noise reduction, it is further preferable to utilize a difference value defined based on both difference value (first difference value) between a signal based on a physical quantity obtained at a given measurement time and a correction signal obtained right before that measurement time and difference value (second difference value) between a signal based on a physical quantity obtained at a given measurement time and a correction signal obtained at a time further previous to a time right before that measurement time. More specifically, a scheme of selecting one difference value between the first difference value and the second difference value, a scheme of multiplying either one of or both of the first difference value and the second difference value by a desired coefficient and of selecting either one difference value, and a scheme of taking an average value of the first difference value and the second difference value as the difference value are applicable.

The second filter coefficient output unit 55 outputs a second filter coefficient a2 based on a difference value input from the difference value calculating unit 54.

The second filter coefficient output unit 55 outputs the second filter coefficient a2 based on a difference value between a signal on the basis of a physical quantity obtained at a given measurement time and a correction signal obtained right before that measurement time, and a difference value between a signal based on a physical quantity obtained at a given measurement time and a correction signal obtained at a time further previous to a time right before that measurement time to that measurement time. Moreover, the second filter coefficient output unit 55 outputs, as the second filter coefficient, a coefficient that increases the contribution of the signal based on the physical quantity to the new correction signal when the difference value between the signal based on the physical quantity and the correction signal or the difference value between different correction signals from each other is relatively large. When the difference value between the signal based on the physical quantity and the correction signal or the difference value between different correction signals from each other is relatively small, the second filter coefficient output unit outputs, as the second filter coefficient, a coefficient that increases the contribution of the correction signal to the new correction signal.

Figure 5:
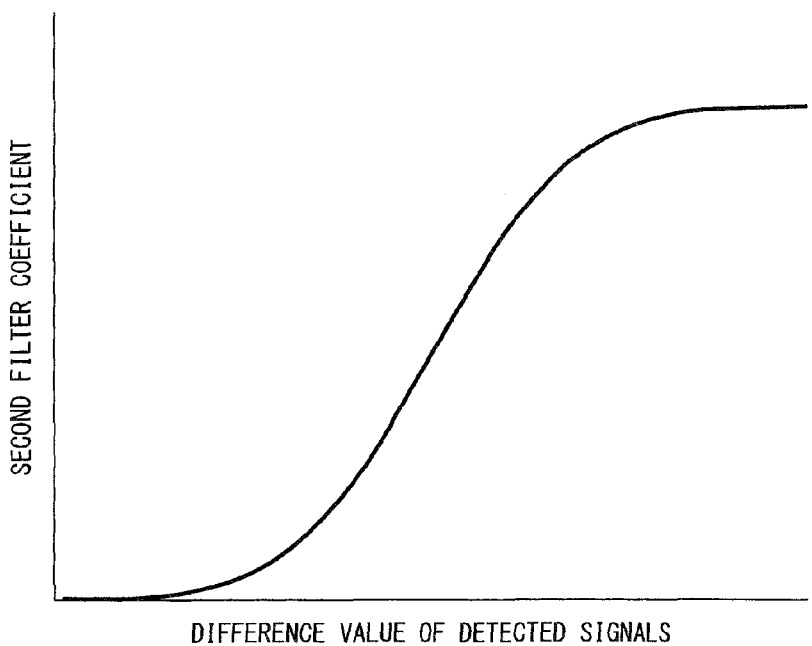
FIG. 5 is a diagram illustrating an example case in which a second filter coefficient is set based on a difference value of a correction signal obtained from an output by a difference value calculating unit.

FIG. 5 is a diagram illustrating an example case in which the second filter coefficient is set based on the difference value between correction signals obtained from the output by the difference value calculating unit. In FIG. 5, when the difference value is small, the second filter coefficient becomes small, and when the difference value is large, the second filter coefficient becomes large.

In order to set the second filter coefficient based on a digital signal, it can be realized if a table in accordance with a desired input/output characteristic is prepared. Or otherwise, it can be also realized by employing a circuit that calculates the second filter coefficient as a function of difference values.

The filter coefficient selecting unit 56 selects either one of the first filter coefficient a1 and the second filter coefficient a2 which increases the contribution of the signal based on the physical quantity to the new correction signal. That is, either one of the first filter coefficient a1 or the second filter coefficient a2 is selected as the filter coefficient a based on a predetermined criterion. Example selection criteria are a scheme of selecting the maximum or minimum value when the two values are compared, a scheme of selecting an average value, and a scheme of utilizing a product. As an example, a selection scheme based on a criteria represented by following formula (2) is applied, and a coefficient having a larger value is selected as the filter coefficient.

$$a=\max(a1,a2) \tag{2}$$

(where a is a filter coefficient, a1 is the first filter coefficient, and a2 is the second filter coefficient)

Figure 7A:
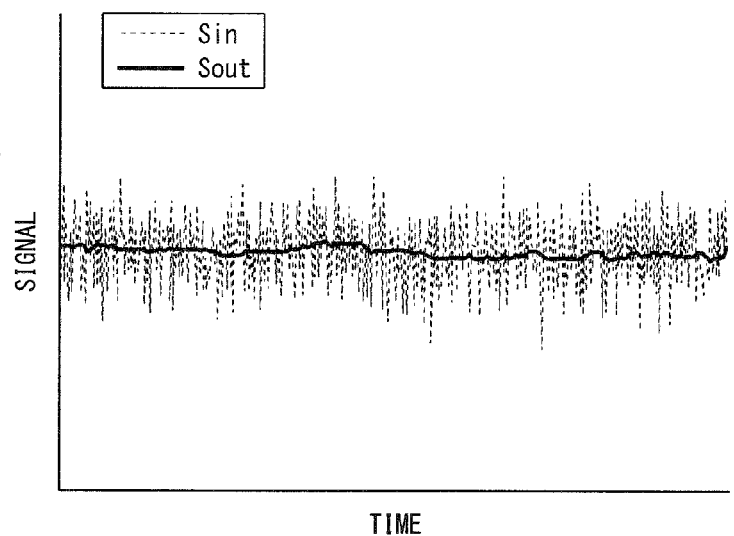
FIG. 7A is a diagram illustrating a correction signal according to the second embodiment.
Figure 7B:
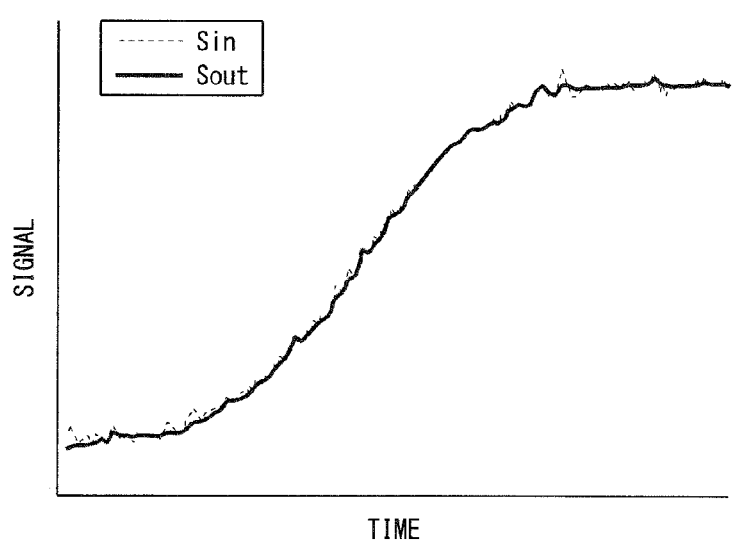
FIG. 7B is a diagram illustrating a correction signal according to the second embodiment.
Figure 7C:
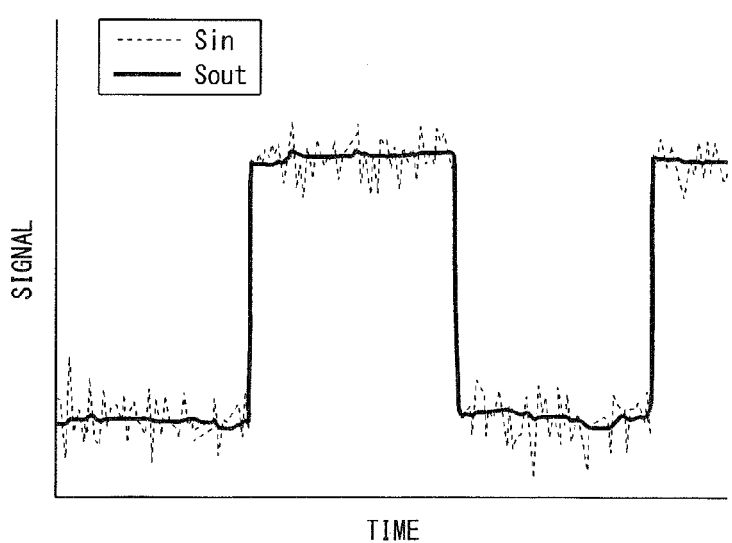
FIG. 7C is a diagram illustrating a correction signal according to the second embodiment.

According to the above-explained second embodiment, physical quantity signals of three kinds like the above-explained first embodiment are input in the physical quantity computing apparatus in FIG. 4. FIGS. 7A to 7C illustrate correction signals (Sout) to the respective inputs (Sin).

(1) The correction signal to the physical quantity signal with a constant value has less noise components at a good level.

(2) The correction signal to the sinusoidal physical quantity signal has less noise components and has no delay to the input signal.

(3) The correction signal to the rectangular physical quantity signal has less noise components and has no delay in a region where the signal keenly changes.

Comparative Example

Figure 8A:
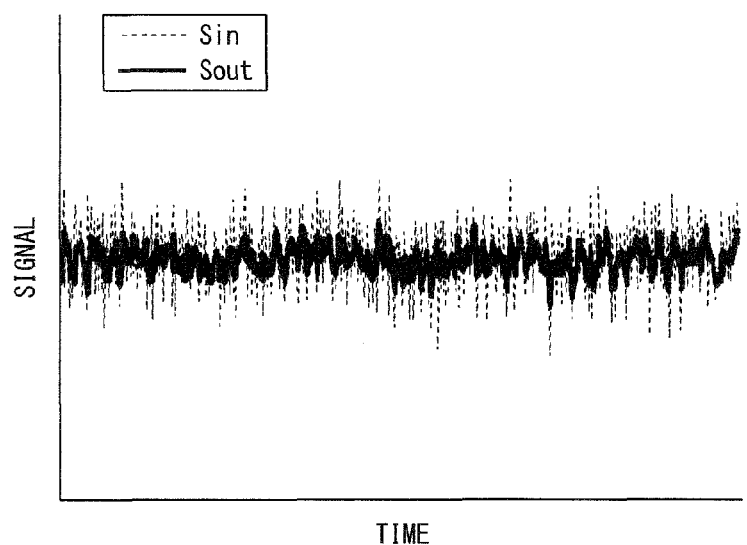
FIG. 8A is a diagram illustrating an output signal in a comparative example.
Figure 8B:
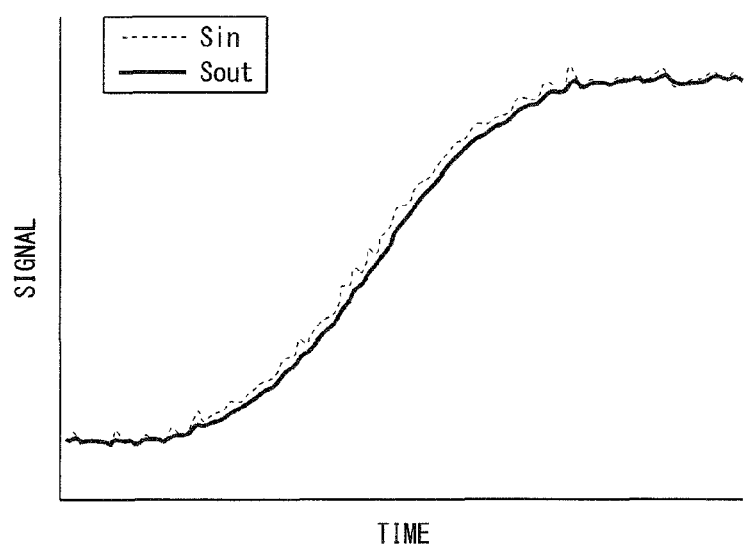
FIG. 8B is a diagram illustrating an output signal in a comparative example.
Figure 8C:
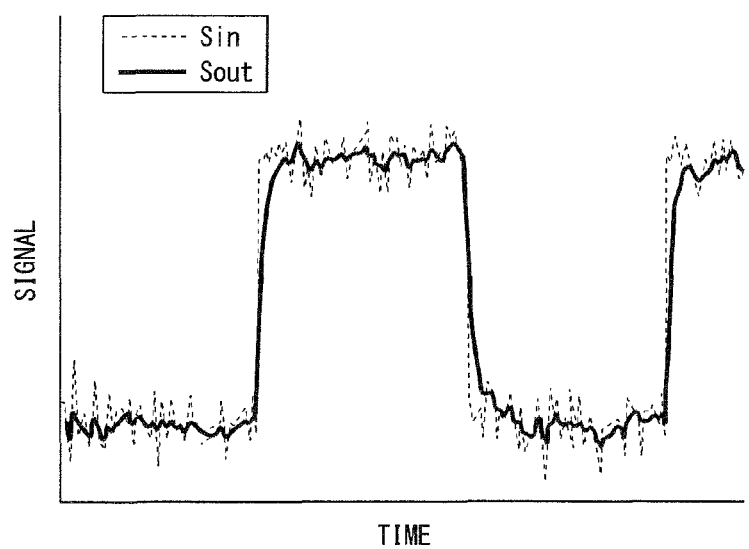
FIG. 8C is a diagram illustrating an output signal in a comparative example.

FIGS. 8A to 8C are diagrams illustrating output signals of a comparative example. In the case of the comparative example illustrated in FIGS. 8A to 8C, respective physical quantity signals of three kinds like the above-explained first embodiment are input in the conventional physical quantity computing apparatus in FIG. 1. FIGS. 8A to 8C illustrate output signals (Sout) to the respective inputs (Sin).

(1) The correction signal to the physical quantity signal with a constant value has noise component not sufficiently canceled.

(2) The correction signal to the sinusoidal physical quantity signal has less noise component but has a slight delay to the input signal.

(3) The correction signal to the rectangular physical quantity signal has a slight delay in a region where the signal keenly changes.

As explained above, according to the physical quantity computing apparatus including the large/small relationship determining unit, the first filter coefficient output unit, and the correction signal output unit described in the first and second embodiments, it can be understood that in comparison with the physical quantity computing apparatus of the comparative example:

(1) the correction signal having noise components canceled well is obtained in case of the physical quantity signal with a constant value; and (2) the ideal correction signal having no delay is obtained in case of the sinusoidal physical quantity signal.

Moreover, according to the physical quantity computing apparatus that further includes the difference value calculating unit 54, the second filter coefficient output unit 55 and the filter coefficient selecting unit 56 of the second embodiment illustrated in FIG. 4, it can be understood that (3) no delay is caused to the rectangular input signal like a signal that keenly changes.

The physical quantity measuring apparatus of the present invention includes a physical quantity signal output apparatus having a physical quantity measuring element that outputs a physical quantity signal necessary to measure a target physical quantity and each of the above-explained physical quantity computing apparatuses.

Third Embodiment

Figure 9:
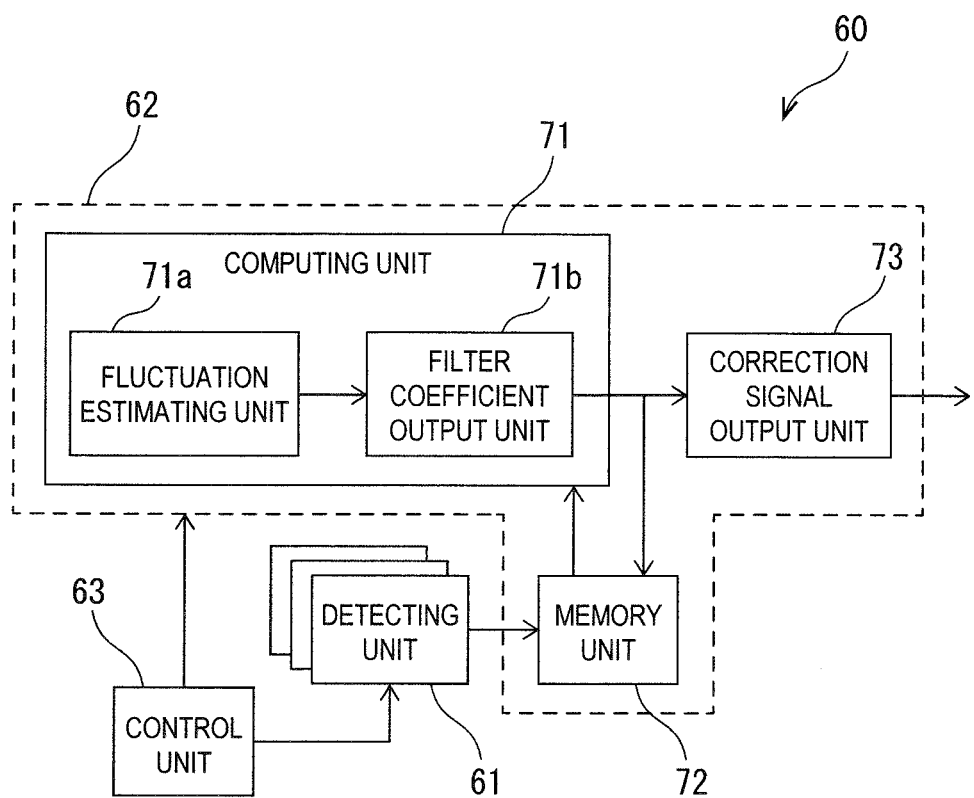
FIG. 9 is a block diagram for explaining a physical quantity measuring apparatus according to a third embodiment of the present invention.

FIG. 9 is a block diagram for explaining a physical quantity measuring apparatus according to a third embodiment of the present invention, which shows a sensor apparatus that is an example configuration to carryout the present invention. In this figure, reference numerals 60, 61, 62, 63, 71, 71a, 71b, 72, and 73 denote a physical quantity measuring apparatus, a detecting unit (physical quantity signal output apparatus), a physical quantity computing apparatus, a control unit, a computing unit, a fluctuation estimating unit, a filter coefficient output unit, a memory unit, and a correction signal output unit, respectively.

That is, the physical quantity measuring apparatus 60 of the present invention includes the detecting unit 61, the physical quantity computing apparatus 62, and the control unit 63, and the physical quantity computing apparatus 62 includes the computing unit 71 having the fluctuation estimating unit 71a and the filter coefficient output unit 71b, the memory unit 72, and the correction signal output unit 73.

The physical quantity measuring apparatus 60 of the third embodiment includes the physical quantity computing apparatus 62 that computes a physical quantity from a signal based on a physical quantity output by the physical quantity signal output apparatus 61. The physical quantity computing apparatus 62 includes the fluctuation estimating unit 71a that estimates the fluctuation of the physical quantity detected by the physical quantity signal output apparatus 61, the filter coefficient output unit 71b which sets a filter coefficient based on the fluctuation estimated by the fluctuation estimating unit 71a, and which outputs the set filter coefficient, and the correction signal output unit 73 that outputs a correction value of an output value based on the filter coefficient output by the filter coefficient output unit 71b and an output value from the physical quantity signal output apparatus 61.

Example signals applicable to an estimation of the fluctuation of the physical quantity by the fluctuation estimating unit 71a in the present invention are either one of or both of:
1. a signal based on a physical quantity output by the physical quantity signal output apparatus, e.g., a signal based on a physical quantity measured by a sensor or the like; and 2. a correction signal obtained by correcting a signal output by the physical quantity signal output apparatus through a filter.

The fluctuation estimating unit 71a includes a first fluctuation estimating unit (corresponding to a determination scheme B: detecting a quasi-static condition) that estimates the fluctuation of the physical quantity based on the Distribution status of physical quantities obtained at plural measurement times, and a second fluctuation estimating unit (corresponding to a determination scheme A: detecting a fluctuation) that estimates the fluctuation of the physical quantity based on a signal on the basis of a physical quantity obtained at a given measurement time, and a signal based on a physical quantity obtained at a measurement time close to the former measurement time. The filter coefficient output unit 71b sets the filter coefficient based on the fluctuation of the physical quantity estimated by the first fluctuation estimating unit or the second fluctuation estimating unit, and outputs the set filter coefficient. For estimation of the fluctuation of the physical quantity based on the Distribution status of physical quantities, as explained above, either one of or both of distribution of signals based on physical quantities output by the physical quantity signal output apparatus and the correction signal obtained by correcting a signal output by the physical quantity signal output apparatus through a filter.

The second fluctuation estimating unit includes a fluctuation determining unit that determines whether or not the fluctuation of the physical quantity is smaller than a predetermined threshold. The first fluctuation estimating unit estimates the fluctuation of the physical quantity based on the Distribution status of physical quantities obtained at plural measurement times on the basis of the determination result by the fluctuation determining unit.

The filter coefficient output unit 71b includes first filter coefficient output units 32, 52 that output the first filter coefficient based on the first fluctuation estimating unit, a second filter coefficient output unit 55 that outputs the second filter coefficient based on the second fluctuation estimating unit, and a filter coefficient selecting unit 56 that selects either one of the first and second filter coefficients as the above-explained filter coefficient.

As an example configuration that corrects the signal based on the physical quantity using the above-explained first filter coefficient, the following configuration can be employed. The correction signal output unit 73 outputs a new correction signal based on a signal on the basis of a physical quantity obtained at a given measurement time, a correction signal obtained before that measurement time, and the filter coefficient. The fluctuation estimating unit 71a includes a large/small relationship determining unit 51 that determines the large/small relationship between the signal based on the physical quantity and the correction signal obtained before that measurement time. The filter coefficient output unit 71b includes the first filter coefficient output units 32, 52 that output the first filter coefficient based on plural large/small relationships.

The detecting unit 61 detects, amplifies, and performs A/D conversion on a physical quantity. Moreover, the memory unit 72 stores digital values of physical quantities (measured values) detected by the detecting unit by a predetermined number of detections. The computing unit 71 performs a computing process on the measured value and the measured value stored in the memory unit 62. Data having undergone the computing process by the computing unit 71 is output to the exterior through the correction signal output unit 73. The control unit 63 selects the detecting unit 61, controls a timing and a cycle of causing the detecting unit 61 to detect a physical quantity, and selects an output scheme from the correction signal output unit 73, thereby comprehensively controlling the operation of the sensor apparatus. The control unit 63 also has a function of, for example, communicating with an external apparatus.

The operations of the respective units will be explained below.

[Detecting Unit]

The detecting unit 61 includes a physical quantity measuring element, i.e., a function of detecting a target physical quantity and converting the detected physical quantity into an electric signal. Example physical quantity measuring elements applied are a hall element and a magnetoresistance effect element when a target physical quantity is magnetism, and are a mechanical acceleration sensor, a capacitance type or a piezoresistance type MEMS (microelectromechanical system) acceleration sensor when the target physical quantity is acceleration. In addition to the function of detecting a physical quantity and converting the detected physical quantity into an electric signal, the physical quantity measuring element includes an amplifying function, and a function of converting an analog signal into a digital signal. A plurality of physical quantity detecting elements can be used as components of the detecting unit in accordance with the measurement dimension of the target physical quantity, and in the case of, for example, a three-dimensional magnetic sensor, the detecting unit may include three magnetic sensors having respective magnetism-sensitive characteristics along three different axes.

The detecting unit 61 may employ a configuration having different physical quantity detecting elements to measure plural kinds of physical quantities. When a plurality of physical quantity detecting elements are used, a plurality of computing units 71 may be provided in accordance with the number of physical quantity detecting elements, and a plurality of computing units may be provided for each kind of physical quantity detecting elements. A single computing unit may be provided regardless of the kind and number of the physical quantity detecting elements, and for example, may process plural kinds and plural numbers of physical quantity signals through a time-division process. It is normal that a correction process is performed on a measured value obtained from the physical quantity detecting element. A sensitivity correcting process, an offset correcting process, and other various processes are possible, but according to the present invention, the detecting unit 61 may have those functions, or the computing unit 71 may have those functions. It is up to a designer for newly providing a correcting unit having a correction function. The detecting unit 61 detects a physical quantity for each measurement timing adjusted by the control unit 63, and the detected physical quantity is normally converted into digital data as a measured value. The measurement timing is optional, but it is preferable to control a measurement for each predetermined cycle. A measured value is output to and stored in the memory unit 72 successively or at an arbitrary cycle adjusted by the control unit 63 or plural pieces of measured data are collectively output to and stored in the memory unit.

[Computing Unit]

The computing unit 71 performs a filter process on the measured value stored in the memory unit 72. In order to perform the filter process, the computing unit 71 further includes the filter coefficient output unit 71*b* and a data fluctuation estimating unit (simply referred to as the "fluctuation estimating unit" in some cases) 71*a*, and the operations of the respective units are controlled by the control unit 63.

The filter coefficient output unit 71*b* can be selected appropriately in accordance with the characteristics of superimposed noises. When noises are present in widespread frequency ranges like thermal noises, a low-pass filter is preferable. Filters of various schemes can be employed to realize the low-pass filter, but an explanation will be given of an example case in which a lag filter well-known as a digital filter is utilized.

A lag filter that obtains a new corrected measured value from a measured value Sin obtained at a given measurement time and an original corrected measured value Sold obtained upon application of a filter before that measurement time can be defined as the above-explained formula (1).

According to the formula (1), a new corrected measured value Snew is largely affected by Sin when the filter coefficient a is large, i.e., when the filter coefficient is close to 1, and is largely affected by Sold when the filter coefficient is small, i.e., when the filter coefficient is close to 0. Sold has an implication like an average of the measured values obtained before the measurement time, and the smaller the filter coefficient a is, the larger the number of the past measured values to be averaged is, and the effect of thermal noises, etc., is reduced through averaging. Hence, by setting the filter coefficient to be small, when noises are superimposed on Sin, the contribution of the noises superimposed on Sin to Snew can be reduced. The filter coefficient is set based on information on a data fluctuation calculated by the data fluctuation estimating unit to be discussed later. The filter coefficient output unit 71*b* picks up latest measurement data (corresponding to Sin) among plural pieces of measured data stored in the memory unit 72, and picks up an original corrected measured value (corresponding to Sold) stored in the memory unit 72 to perform the above-explained filter computation. The obtained new corrected measured value (corresponding to Snew) is stored in the memory unit 72, and is transmitted to the correction signal output unit 73 that outputs the transmitted data to the exterior.

[Data Fluctuation Estimating Unit]

Every time a measured value is obtained, such a measured value is stored in the memory unit 72. Measured values by what corresponds to a predetermined number of measurements are stored, but such a predetermined number of measurements is adjusted by the control unit 63 as a fixed value or a dynamic value. The data fluctuation estimating unit 71*a* picks up several pieces of measured data among the pieces of measured data by what corresponds to the plural measurements stored in the memory unit 72 or estimates information on the fluctuation of data from the data distribution of the corrected measured values stored in the memory unit 72 based on a certain algorithm, and outputs the result to the filter coefficient output unit 71*b*. The filter coefficient output unit 71*b* sets the filter coefficient based on the information on the estimated data distribution. When the fluctuation of data is large, a filter coefficient that increases the tracking capability is set, and when the fluctuation of data is small, a filter coefficient that decreases the contribution of noises is set. In the case of the lag filter, the filter coefficient a is increased in order to increase the tracking capability, and is decreased in order to decrease the contribution of the noises.

The data fluctuation estimated from the data distribution determined by the data fluctuation estimating unit 71*a* is a concept including the varying of the amplitude of data composing plural pieces of data for a determination, and a transition in time of data amplitude, and according to the present invention, estimation of the fluctuation means that the data fluctuation estimating unit estimates the fluctuation of a physical quantity based on the distribution or the change tendency in time of physical quantities detected by the detecting unit. Various fluctuation estimating techniques can be selected to realize such an estimation, but as an example, the following data distribution determining techniques and a combination thereof can be applied.

When a measured value measured by the sensor apparatus keenly changes like pulses or a rectangular wave, it is desirable to increase the tracking capability, and when there is no change in data, it is desirable to decrease the contribution of noises.

In such a case, a scheme (hereinafter, referred to as a determination scheme A) of utilizing data in small quantity for a determination, and of utilizing, for example, a difference between the maximum value and the minimum value among the data in small quantity or a difference between the latest data and oldest data is effective. For example, a difference between the data measured at latest and data measured right previous to that measurement is determined, and when such a difference is equal to or greater than a predetermined threshold, it is determined that the fluctuation of the data is large and the filter coefficient with a good tracking capability is set. When such a difference is equal to or smaller than the threshold, the filter coefficient that further suppresses the noises is set. In the case of the exemplified lag filter, when the fluctuation is small, the filter coefficient a is set to be a small value, and when the fluctuation is large, the large filter coefficient a is set. In order to reduce the contribution of the noises superimposed on a signal, it is appropriate if a large value is selected for the threshold for determining that there is a fluctuation in data. When the threshold is larger than the fluctuation in the measured value due to noises, the fluctuation in an output value by noises can be suppressed by the filter, and a change level becomes equal to or larger than the threshold in a range where the measured value changes, so that the filter output follows the measured value. When, however, an excessively large value is selected for the threshold for determining that there is a fluctuation in the measured value, a condition in which the filter coefficient a is a small value is maintained for a long time at the rising and falling of a rectangular signal, and thus the tracking capability to the rectangular signal becomes poor. Hence, the threshold is selected in consideration of the value of noises and the waveform to be followed.

According to this scheme, however, when the measured value measured by the sensor slowly changes, another technical problem occurs. When the measured value slowly changes, the variation between the respective measured values is small, and a difference between the variation and the fluctuation by noises is small or the noises are rather large in some cases. In this case, although the measured value measured by the sensor apparatus fluctuates, the filter coefficient a is maintained to be small, and thus the tracking capability becomes poor. Accordingly, an error between the measured value Sin and the new corrected measured value Snew becomes large, resulting in the lack of the reliability of the filter output data. In this case, another determination scheme of the fluctuation in a data distribution is applied. For example, a standard deviation of plural pieces of data by what corresponds to a predetermined number of measurements is calculated, and is compared with a predetermined threshold (this scheme is referred to as a determination scheme B). When the threshold is set to be a value corresponding to a noise value normally expected, if the standard deviation is larger than the threshold, it can be regarded that there is some fluctuation. When it is determined that the data fluctuates through the determination scheme B although it is determined that there is no fluctuation through the determination scheme A, the filter unit sets the filter coefficient based on the determination scheme B.

In this case, for example, it is appropriate if the filter coefficient is set to be an intermediate filter coefficient between the filter coefficient set when it is determined that the data fluctuation is large and the filter coefficient set when it is determined that the data fluctuation is small through the determination scheme A.

When it is estimated that there is a fluctuation through the determination scheme A, no matter how the data fluctuation is determined through the determination scheme B, a filter coefficient set when it is determined that the data fluctuation is large through the determination scheme A can be applied. Hence, by combining the determination scheme A and the determination scheme B, it can be determined whether the measured data largely fluctuates (fluctuated condition), slowly fluctuates (quasi-fluctuated condition), or does not fluctuate (static condition).

By applying such a technique, the tracking capability to the measured value with a rectangular change can be also enhanced. When, for example, the determination scheme A is applied to a portion where a condition changes from the rising (fluctuated condition) of the waveform of the rectangular change to a condition having no change (static condition), a small value is selected to a filter coefficient a in the static condition, and the tracking capability to the waveform becomes poor since it is more likely to be affected by the past measured value, but when the quasi-fluctuated condition is determined through the determination scheme B, an intermediate filter coefficient between two filter coefficients set based on results by the determination scheme A is selected. Accordingly, a filter process can be performed which reduces the contribution of noises to some level while reducing the contribution of past measured values, and thus the performance of reducing noises can be maintained while improving the tracking capability.

As an example determination scheme A, as explained above, a difference between the measured value measured at latest and the measured value measured right previous to that measurement. When such a difference is equal to or greater than a predetermined threshold, it is determined that the fluctuation is large and the filter coefficient with a good tracking capability is set, and when such a difference is equal to or lower than the threshold, the filter coefficient that decreases the contribution of noises is set. This is a typical scheme, and in addition to such a scheme, following schemes are applicable.

A difference value between a measured value measured at the latest and a measured value measured before the latest measurement by a number of plural measurements.

A difference value between a measured value measured at the latest and a latest corrected measured value.

A difference value between a measured value measured at the latest and a corrected measured value calculated before by a number of plural calculations.

The determination scheme A is to compare the latest measured value and measured values in small quantity or corrected measured values close to the latest measured value in time, and to determine a fluctuation within a short time, and is an appropriate scheme to determine a sudden and keen change in the measured value without a time delay. Other schemes than the above-explained one can be applied.

It is not always necessary that the measured value is the latest measured value, and a good result can be obtained in some cases if a difference between a measured value obtained in past by an appropriate cycle from the latest measurement and past measured data or corrected measured value close to that measured value is applied. This is because by applying such a scheme, a delay can be controlled, and an effect of, for example, suppressing an overshoot of a sudden and keen change can be obtained.

Next, an explanation will be given of an example of the determination scheme B.

As a example scheme of estimating a data fluctuation based on a fluctuation in time that is a change in time of plural pieces of data, for example, the following determination algorithm or a combination thereof can be applied. It is preferable that plural pieces of data should have an obtainment time close to each other in time, and be a set of data sequentially obtained.

1. Whether or not a difference between data successive in time among plural pieces of data for a determination successively exceeds a threshold by a predetermined number of times.

2. A difference between an average value of plural pieces of data at a given time point and the latest measured value among the plural pieces of data for a determination.

3. A difference between an average value of plural pieces of data at a given time point and an average value of plural pieces of data at a time point different from the former time point. For example, a difference between an average value of plural pieces of data old in time and an average value of plural pieces of data new in time among plural pieces of data for a determination.

4. A slope (a differential value) in time of a moving average of plural pieces of data for a determination.

As an example case for the determination scheme B in which a data distribution is determined based on a distribution of plural pieces of data, the following determination algorithm can be applied. It is preferable that the plural pieces of data should have respective obtainment times close to each other in time, and should be a set of data successively obtained.

5. A difference between the maximum value and the minimum value of the plural pieces of data for a determination.

6. A standard deviation or a dispersion of the plural pieces of data for a determination.

7. A total of an average value of the plural pieces of data for a determination and an absolute value of the difference between each piece of data.

The data mentioned in this example includes a past measured value or a past corrected measured value stored in the memory unit.

The determination scheme B determines, using plural measured values and corrected measured values, the distribution thereof and/or a change in time thereof at a time span broader than that of the determination scheme A, and thus it is appropriate to determine a slow change (quasi-static condition) in the measured value that cannot be determined through the determination scheme A.

It is also appropriate to perform a determination based on the large/small relationship between plural pieces of data for a determination as explained in the first and second embodiments, i.e., a total of the differences between measured values and corrected values in plural measured values or corrected values successive in time.

Regarding how to select the above-explained determination scheme, an appropriate scheme can be selected based on a target output characteristic, the characteristics of a target signal, and the computation performance, etc., of an apparatus in the form to which the present invention is applied.

The scheme of utilizing a successive change in the difference value of data based on plural pieces of data successive in time is convenient. When a standard deviation, a difference between average values, and a slope are utilized, it is more appropriate to check a slow fluctuation, etc., and is appropriate when a computation amount and a memory have leeways.

According to the present invention, in accordance with a restriction of a target apparatus and an actual fluctuation of data, a scheme for determining a fluctuation is selected, and it is effective to combine the schemes.

Regarding the plural pieces of data used for determining a data fluctuation, it is not always necessary to utilize data obtained at the latest, and it is advantageous in some cases if data measured several times before, and a piece of or plural pieces of data measured before that time are utilized for a determination.

The determination schemes to be combined may be other schemes than the determination scheme A and the determination scheme B explained in this embodiment as specific examples, but as is exemplified by a combination of the determination scheme A focusing on the tracking capability and the determination scheme B for determining a slow fluctuation, a combination of the determination schemes is desirable which perform determination in different view points from each other and which compensate with each other.

How to set the filter coefficient is not limited to the above-explained example, and an optimized scheme can be examined and adopted in accordance with its application. The number of combined determination schemes is not limited to two, and it should be understood by those skilled in the art that three or four determination schemes can be combined.

Figure 10:
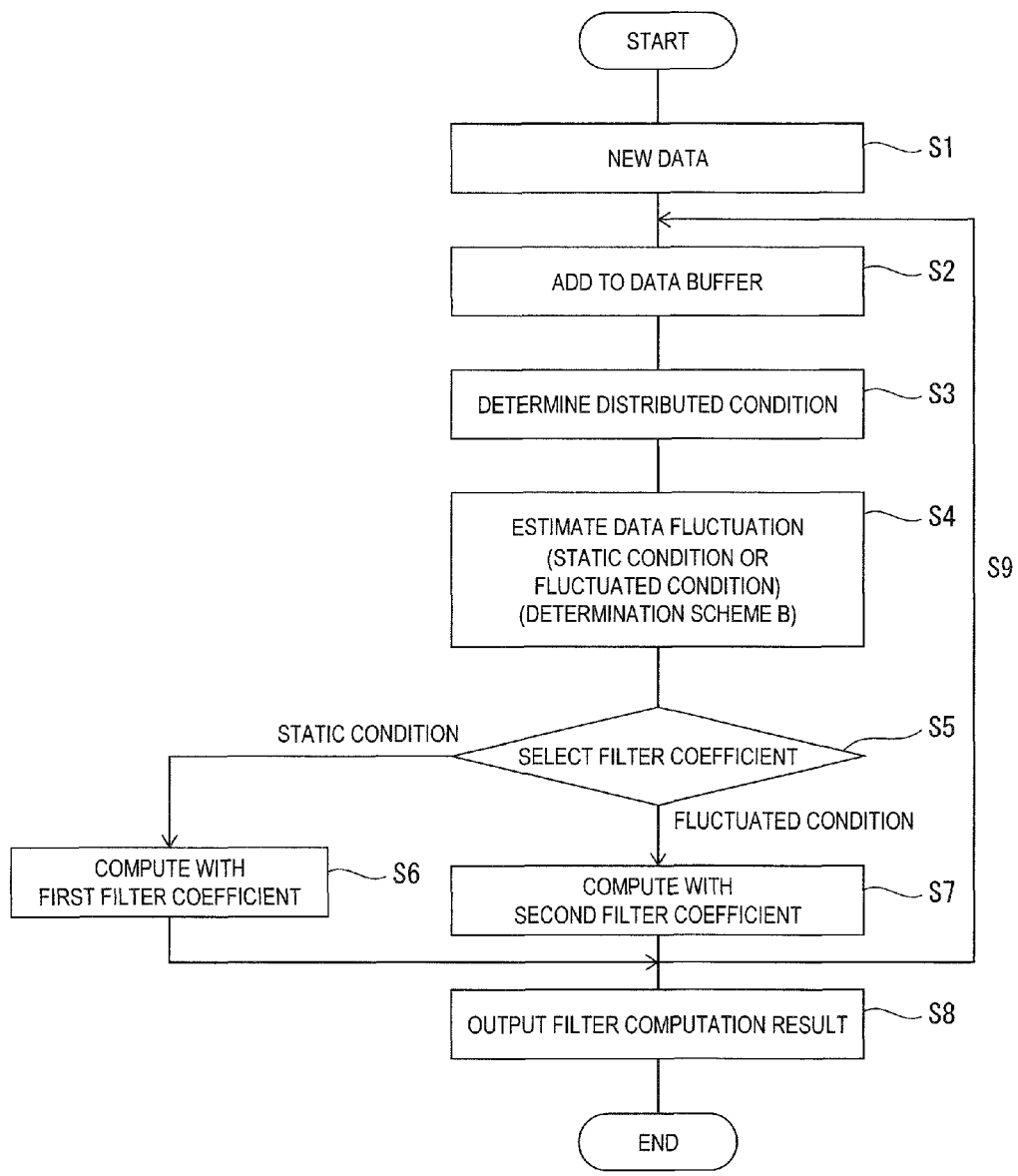
FIG. 10 is a flowchart for explaining a case in which the physical quantity measuring apparatus utilizes two kinds of filter coefficients according to the third embodiment of the present invention.

FIG. 10 is a diagram that is a flowchart for explaining a case in which two kinds of filter coefficients are utilized in the physical quantity measuring apparatus according to the third embodiment of the present invention. When new data is input (step S1), the new data is added to a data buffer (step S2), a distribution status is determined (step S3), the data fluctuation is estimated whether it is in a static condition or in the fluctuated condition (step S4: determination scheme B), and the filter coefficient is selected (step S5). In accordance with the selected filter coefficient, a computation is performed with a first filter coefficient (step S6) or a computation is performed with a second filter coefficient (step S7), and respective filter computation results are output (step S8). Moreover, when a distribution status is determined based on data having undergone correction, the result computed with the first filter coefficient or the second filter coefficient may be added to the data buffer (step S9).

FIG. 11 is a diagram that is a flowchart for explaining a case in which three kinds of filter coefficients are utilized in the physical quantity measuring apparatus according to the third embodiment of the present invention, and indicates a case in which the above-explained determination scheme A and determination scheme B are combined. When new data is input (step S11), the new data is added to the data buffer (step S12), the data fluctuation is estimated whether it is in a static condition, in a quasi-steady condition (determination scheme B), or in a fluctuated condition (determination scheme A) (step S13), the data fluctuation is estimated (step S14: determination scheme B), and the filter coefficient is selected (step S15). In accordance with the selected filter coefficient, a computation is performed with the first filter coefficient (step S16), or a computation is performed with the second filter coefficient (step S17), or a computation is performed with a third filter coefficient (step S18), and respective filter computation results are output (step S19). When a distribution status is determined based on data having undergone correction, computation results with the first filter coefficient, the second filter coefficient, or the third filter coefficient may be respectively added to the data buffer (step S20).

Figure 13A:
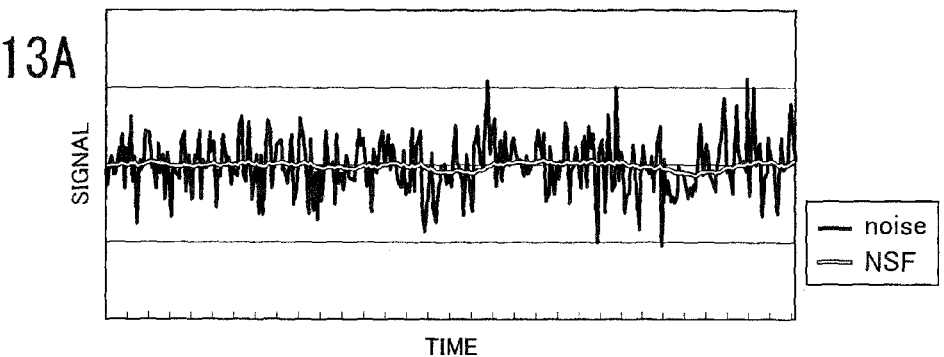
FIG. 13A is a diagram illustrating a correction signal output obtained when a correction signal is calculated through a method of selecting a filter coefficient based on a distribution and fluctuation of the correction signal according to the third embodiment.
Figure 13B:
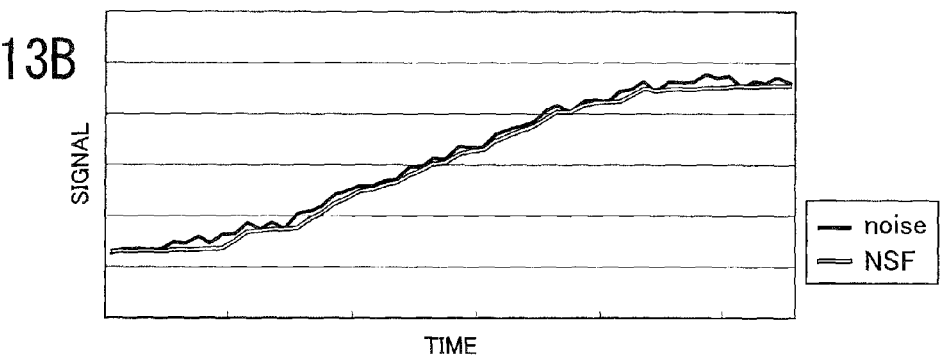
FIG. 13B is a diagram illustrating a correction signal output obtained when a correction signal is calculated through a method of selecting a filter coefficient based on a distribution and fluctuation of the correction signal according to the third embodiment.
Figure 13C:
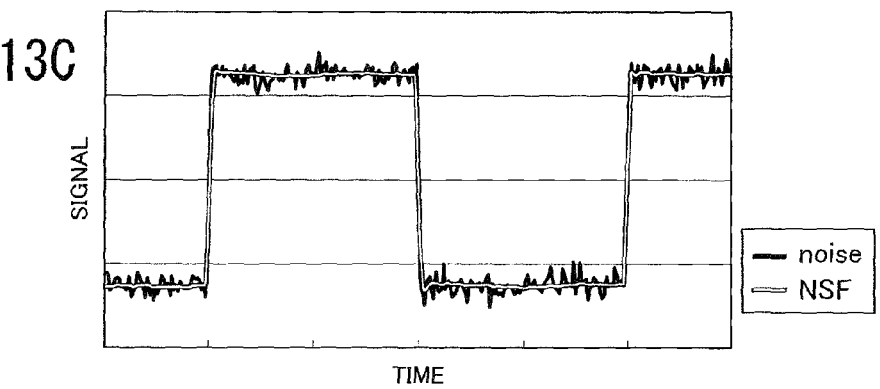
FIG. 13C is a diagram illustrating a correction signal output obtained when a correction signal is calculated through a method of selecting a filter coefficient based on a distribution and fluctuation of the correction signal according to the third embodiment.

FIGS. 13A to 13C are diagrams illustrating correction signal outputs when a correction signal is computed through a scheme of selecting the filter coefficient based on the distribution and fluctuation of correction signals according to the third embodiment, and are diagrams illustrating correction signals having undergone a filter computation when the scheme illustrated in FIG. 11 is applied and performing both determination scheme A and determination scheme B on a steady signal, a sinusoidal signal, and a rectangular signal to which noises are superimposed.

According to the determination scheme A, a fluctuation is estimated based on a difference between a corrected value computed and output most recently and a measured value obtained at the latest, and according to the determination scheme B, a difference between an average value of the corrected values output in most recent six times and the measured value obtained at the latest is determined in comparison with the threshold. The determination threshold is selected accordingly depending on the noises superimposed on the signal and an expected responsiveness.

For the filter computation, the lag filter indicated by the above-explained formula (1) is applied. When it is estimated through the determination scheme A that there is a fluctuation, the filter coefficient a is set to be 0, and the measured value obtained at the latest is directly output. When it is estimated through the determination scheme A that there is no fluctuation but it is estimated through the determination scheme B that there is a fluctuation, it is then determined that there is a quasi-static fluctuation, and the filter coefficient of 0.5 is selected. When it is estimated through both determination scheme A and determination scheme B that there is no fluctuation, the filter coefficient is set to be 1/32.

Figure 12A:
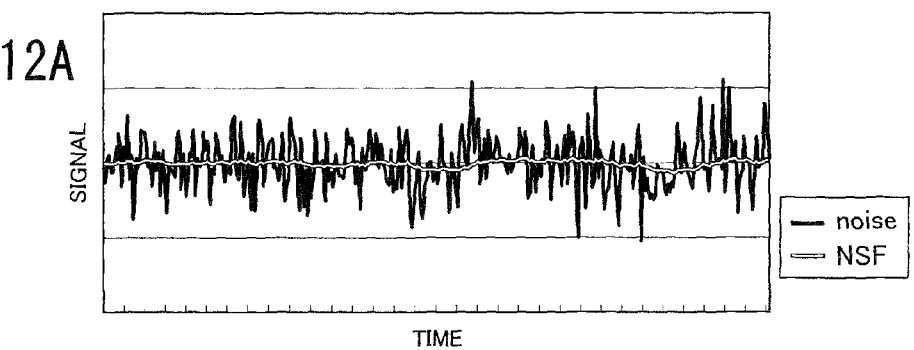
FIG. 12A is a diagram illustrating a correction signal in a reference example.
Figure 12B:
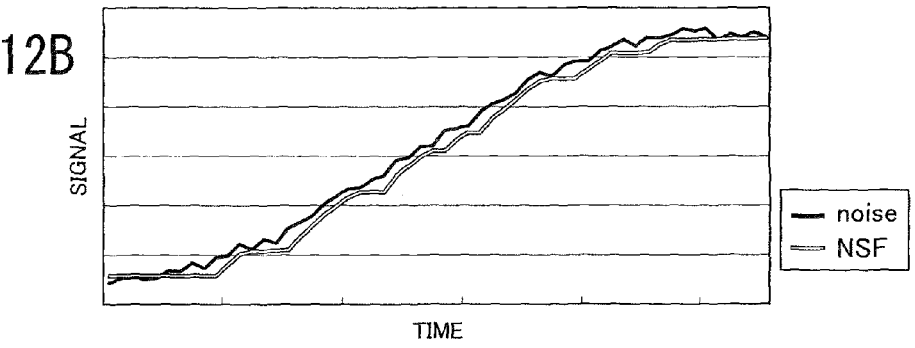
FIG. 12B is a diagram illustrating a correction signal in a reference example.
Figure 12C:
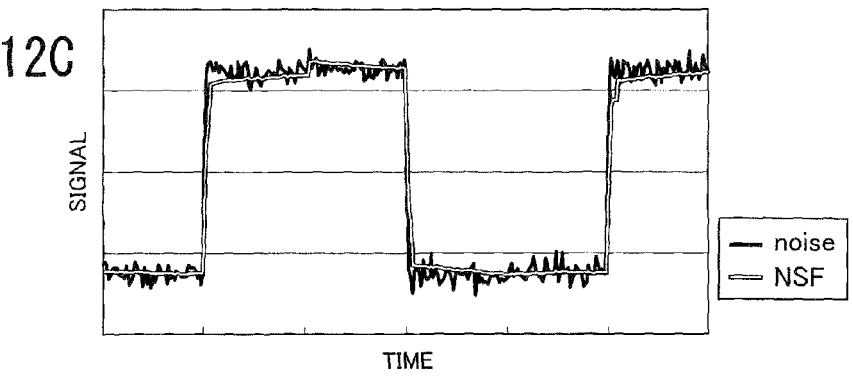
FIG. 12C is a diagram illustrating a correction signal in a reference example.

FIGS. 12A to 12C illustrate, as reference examples, correction signal outputs (NSF) to respective input (noise) having undergone a filter processing when the determination scheme A is applied to the scheme of estimating a fluctuation in FIG. 10.

FIGS. 12A to 12C are diagrams illustrating correction signals in reference examples.

For an estimation of a fluctuation in the reference example, a difference between a corrected value computed and output most recently and a measured value obtained at the latest is applied. The determination threshold is selected accordingly depending on the noises superimposed on a signal and an expected responsiveness. For a filter computation, the lag filter indicated by the above-explained formula (1) is applied and when it is estimated that there is a fluctuation, the filter coefficient a is set to be 0.5. When it is estimated that there is no fluctuation, the selected filter coefficient is set to be 1/32.

In the cases of the reference examples, if the filter coefficient is set to be 0 when it is estimated that there is a fluctuation, the result is likely to be affected by noises, and thus the filter coefficient of 0.5 is selected.

FIGS. 13A to 13C are diagrams illustrating correction signal outputs (NSF) to respective input (noise) when a correction signal is computed through a scheme of selecting the filter coefficient based on the distribution and fluctuation of correction signals according to the third embodiment.

With respect to FIGS. 12A to 12C that are reference examples to which the prior art is applied, according to FIGS. 13A to 13C to which the present invention is applied, it becomes clear that:

(1) a correction signal for a physical quantity signal with a constant value has noise components suppressed well in both cases;

(2) a correction signal for a sinusoidal physical quantity signal has a less delay than that of the reference example, and has waveform noises suppressed well; and (3) a correction signal for a rectangular physical quantity signal has noise components suppressed better than the reference example, and has no delay in a region where the signal keenly changes.

Figure 14A:
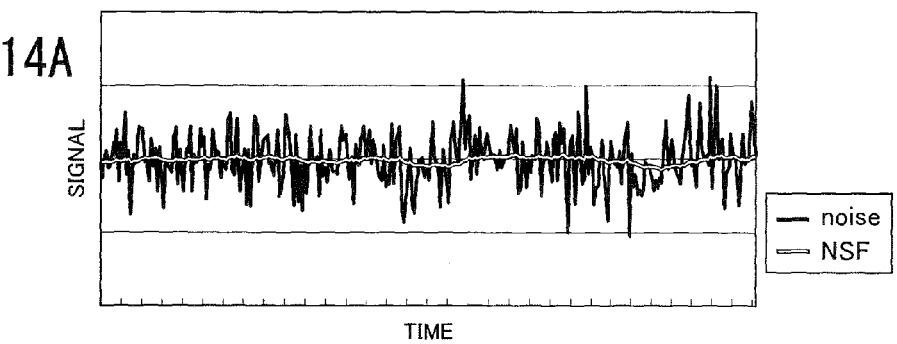
FIG. 14A is a diagram illustrating a correction signal output obtained when a correction signal is calculated through a method of selecting a filter coefficient based on a distribution and fluctuation of a measured value according to the third embodiment.
Figure 14B:
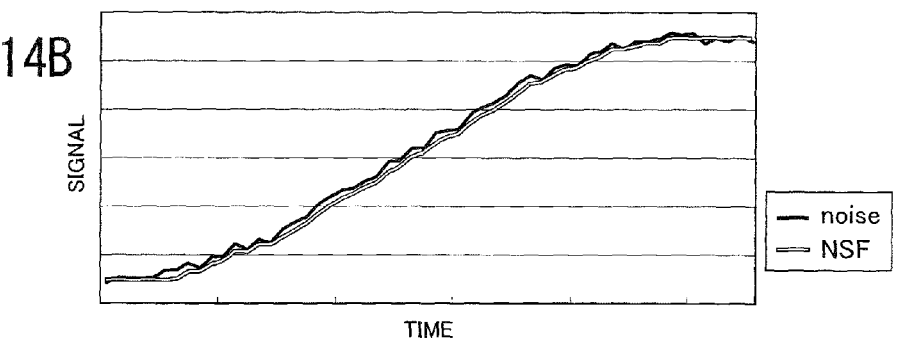
FIG. 14B is a diagram illustrating a correction signal output obtained when a correction signal is calculated through a method of selecting a filter coefficient based on a distribution and fluctuation of a measured value according to the third embodiment.
Figure 14C:
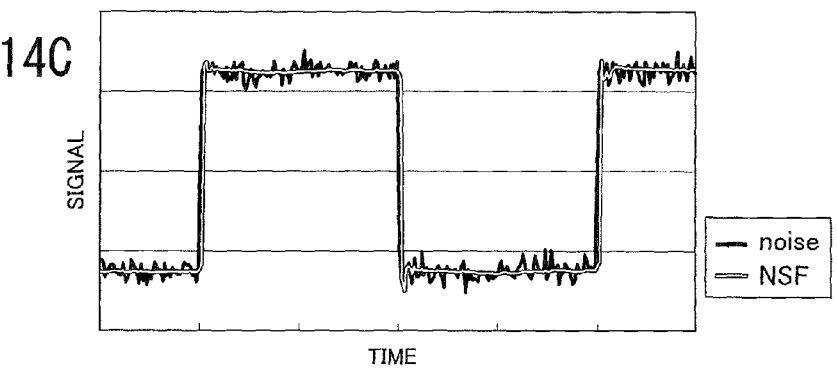
FIG. 14C is a diagram illustrating a correction signal output obtained when a correction signal is calculated through a method of selecting a filter coefficient based on a distribution and fluctuation of a measured value according to the third embodiment.

FIGS. 14A to 14C are diagrams illustrating correction signal outputs when a correction signal (NSF) to respective input (noise), which is computed through a scheme of selecting the filter coefficient based on the distribution and fluctuation of measured values according to the third embodiment, and are diagrams illustrating example cases in which a correction signal is obtained through a filter computation applying the scheme of FIG. 11 utilizing both determination scheme A and determination scheme B to a signal with a constant value, a sinusoidal signal, and a rectangular signal to which noises are superimposed and only a measured value is utilized for a determination.

According to the determination scheme A, a fluctuation is estimated based on a difference between a measured value obtained at the latest and a measured value obtained most recently other than the latest time, and according to the determination scheme B, a difference between the measured value obtained at the latest and an average of measured values obtained at recent six measurements other than the latest measurement is determined in comparison with the threshold. The determination threshold is selected accordingly depending on noises superimposed on a signal and an expected responsiveness.

For the filter computation, the lag filter indicated by the above-explained formula (1) is applied. When it is estimated through the determination scheme A that there is a fluctuation, the filter coefficient a is set to be 0, and the measured value obtained at the latest is directly output. When it is estimated through the determination scheme A that there is no fluctuation but it is estimated through the determination scheme B that there is a fluctuation, it is then determined that there is a quasi-static fluctuation, and the filter coefficient of 0.5 is selected. When it is estimated through the determination scheme B that there is no fluctuation, the filter coefficient is set to be 1/32.

According to this scheme, like the examples of FIGS. 13A to 13C, good noise suppression and delay characteristic can be obtained in comparison with the reference examples, and the advantages of the present invention are indicated, but according to FIGS. 14A to 14C in comparison with FIGS. 13A to 13C, it becomes clear that a noise suppression for the physical quantity signal with a constant value is substantially equal, a correction signal for sinusoidal physical quantity signal becomes smoother, and the noise suppression and the tracking capability are further improved. The noise suppression to the rectangular physical signal is substantially equal and the responsiveness is excellent, but an overshoot can be observed in a keen change.

As explained above, in order to modify the present invention, various schemes can be applied as a filtering scheme for obtaining a corrected value, and an optimized scheme can be applied in accordance with a target application.

By estimating a data fluctuation based on a distribution of plural pieces of data and a change in time thereof, etc., and setting an appropriate filter coefficient based on the estimation result as explained above, both tracking capability of a measured data and noise reduction can be accomplished. It is typical that the plural pieces of data obtained in most recent past times relative to a time point at which a correction signal is calculated are applied, but depending on the modification of the present invention, a concept of utilizing a future signal of a time point at which the correction signal is calculated is possible. This is practical in the case of a modification, etc., in which measurement is not carried out over an actual time.

In contrast, the above-explained technology disclosed in Patent Document 3 selects an azimuth algorithm based on azimuth information obtained right before through a geomagnetic sensor and current azimuth information, but does not estimate a distribution of obtained data, and set the filter coefficient based on the estimation result. At this time, it is necessary that the threshold for evaluation a difference between azimuth information obtained right before and the current azimuth information should be equal to or greater than the fluctuation of the azimuth information by what corresponds to inherent noises to the geomagnetic sensor. When the inherent noises to the geomagnetic sensor is large, and when the direction of the geomagnetic sensor slowly changes, a situation occurs in which the change in the measured value by what corresponds to a change in the azimuth direction is smaller than the value of noises. It is difficult to distinguish such a slow change (quasi-static condition) from the static condition, and an excessive smoothing algorithm may be applied. This deteriorates the responsiveness, resulting in a deterioration of the tracking capability of an azimuth angle.

Conversely, when it is assumed that an azimuth measuring apparatus uses a geomagnetic sensor to which the present invention is applied, although the direction of the geomagnetic sensor slowly changes, the change in the measured data obtained from the distribution of plural pieces of obtained data is larger than the inherent noises to the geomagnetic sensor, and thus it can be estimated that the condition of the sensor is changing although it is slow. Moreover, appropriate filter coefficients different from a changed condition and a static condition can be set to maintain an appropriate responsiveness while reducing noises. Accordingly, the tracking capability of an azimuth angle can be maintained well in the case of a slow change that brings about a minute change in the measured value in comparison with the sensor-inherent noises, and by also utilizing an estimation for a fluctuation appropriate for a keen change, the tracking capability of the azimuth angle can be maintained well. It is a technology that can maintain both noise suppression and responsive tracking capability well for a slow fluctuation in a measured value and a keen change in the measured value in a measuring system having large inherent noises.

TABLE 1

|  | Constant Wave Input | Sinusoidal Wave Input | Rectangular Wave Input |
| --- | --- | --- | --- |
| Comparative Example | Large Noises | Slight Delay Observed | Slight Delay Observed |
| Reference Example | Good | Delay Observed and Large Noises | Delay Observed |
| First Example | Good | Good | Good |
| Second Example | Good | Good | Good |
| Third Example (FIG. 13) | Good | Good | Good |
| Third Example (FIG. 14) | Good | Excellent | Good but Slightly Overshoot |

As explained above, by estimating a fluctuation in data and by setting the appropriate filter coefficient based on the estimation result, both tracking capability to the measured value and noise reduction can be accomplished. Moreover, when estimating the fluctuation in data, fluctuation, quasi-static, and static, etc., of data are determined based on plural algorithms, thereby enabling an appropriate selection of the filter coefficient in accordance with various changes in the measured value.

A physical quantity measuring method according to the present invention is a physical quantity measuring method of measuring a physical quantity from a signal based on a physical quantity output by a physical quantity signal output apparatus. The method includes a detection step for detecting a signal based on a physical quantity through a detecting unit, a fluctuation estimating step for estimating a fluctuation in the physical quantity detected in the detection step through a fluctuation estimating unit, a filter coefficient output step for setting a filter coefficient based on the fluctuation estimated in the fluctuation estimating step, and outputting the filter coefficient through a filter coefficient output unit, and a correction signal output step for outputting, based on the filter coefficient output through the filter coefficient output step and an output value output by the detecting unit, a correction value of that output value through a correction signal output unit.

Moreover, the fluctuation estimating step includes a first fluctuation estimating step for estimating a fluctuation in the physical quantity based on a distribution status of physical quantities obtained at multiple measurement times, and a second fluctuation estimating step for estimating a fluctuation in the physical quantity based on a signal on a basis of a physical quantity obtained at a given measurement time and a signal on a basis of a physical quantity obtained at a measurement time close to the former measurement time, and the filter coefficient output step sets the filter coefficient based on the fluctuation in the physical quantity estimated through the first fluctuation estimating step or the second fluctuation estimating step, and outputs the filter coefficient.

The second fluctuation estimating step includes a fluctuation determining step for determining whether or not the fluctuation in the physical quantity is smaller than a predetermined threshold, and the first fluctuation estimating step estimates the fluctuation in the physical quantity based on the distribution status of physical quantities obtained at the multiple measurement times and based on a determination result through the fluctuation determining step.

The filter coefficient output step includes a first filter coefficient output step for outputting a first filter coefficient based on the first fluctuation estimating step, a second filter coefficient output step for outputting a second filter coefficient based on the second fluctuation estimating step, and a filter coefficient selecting step for selecting either one of the first and second filter coefficients as the filter coefficient.

The correction signal output step outputs a new correction signal based on a signal on a basis of a physical quantity obtained at a given measurement time, a correction signal obtained before the measurement time, and the filter coefficient, the fluctuation estimating step includes a large/small relationship determining step for determining a large/small relationship between the signal on the basis of the physical quantity and the correction signal obtained before the measurement time, and the filter coefficient output step includes a first filter coefficient output step for outputting a first filter coefficient based on the plural large/small relationships.

The physical quantity measuring method further includes in addition to the large/small relationship determining step for determining the large/small relationship between the signal on the basis of the physical quantity and the correction signal and the first filter coefficient output step for outputting the first filter coefficient based on the plurality of large/small relationships, a difference value calculating step for calculating a difference value between the signal on the basis of the physical quantity and the correction signal or a difference value between correction signals obtained at different timings from each other, a second filter coefficient output step for outputting a second filter coefficient based on the difference value, and a filter coefficient selecting step for selecting either one of the first and second filter coefficients as the filter coefficient to obtain the filter coefficient.

When in a desired cycle, the large/small relationship between the signal based on the physical quantity and the correction signal is relatively deviated to either large or small, the first filter coefficient output step is a step for outputting, as the first filter coefficient, a coefficient that increases a contribution of the signal based on the physical quantity to the new correction signal, and when there is no relative deviation in the large/small relationship between the signal based on the physical quantity and the correction signal, the first filter coefficient output step is a step for outputting, as the first filter coefficient, a coefficient that increases a contribution of the correction signal to the new correction signal.

The second filter coefficient output step is a step for outputting the second filter coefficient based on a difference value between a signal on a basis of the physical quantity obtained at a given measurement time and a correction signal obtained right before the measurement time, and a difference value between a signal on a basis of the physical quantity obtained at a given measurement time and a correction signal obtained two time points before the measurement time.

When the difference value between the signal based on the physical quantity and the correction signal or the difference value between different correction signals from each other is relatively large, the second filter coefficient output step is a step for outputting, as the second filter coefficient, a coefficient that increases a contribution of the signal based on the physical quantity to the new correction signal, and when the difference value between the signal based on the physical quantity and the correction signal or the difference value between different correction signals from each other is relatively small, the second filter coefficient output step is a step for outputting, as the second filter coefficient, a coefficient that increases a contribution of the correction signal to the new correction signal.

The filter coefficient selecting step is a step for selecting either one of the first and second filter coefficients that further increases the contribution of the signal based on the physical quantity to the new correction signal.

The correction signal output step is a step for outputting the new correction signal through a relational expression indicated by a formula (3):

$$S_{new} = a \times S_{in} + (1-a) \times S_{old} \quad (3),\text{ and}$$

the filter coefficient selecting unit is a step for selecting the filter coefficient through a relational expression indicated by a formula (4):

$$a = \max(a1, a2) \quad (4)$$

where $S_{new}$ is new correction signal, $S_{in}$ is a signal based on a physical quantity, $S_{old}$ is a correction signal, a is a coefficient selected by the filter coefficient selecting unit, $a1$ is a first filter coefficient, and $a2$ is a second filter coefficient.

A physical quantity measuring method is also possible which includes a physical quantity signal output step for outputting a signal based on a physical quantity and the above-explained physical quantity computing method.

A program is also possible which allows a computer to execute the respective computing steps using a physical quantity signal output based on a physical quantity. A computer-readable non-transitory recording medium is further possible which has stored therein the program for executing the respective computing steps.

INDUSTRIAL APPLICABILITY

The present invention realizes a physical quantity measuring apparatus and a physical quantity measuring method which measure a physical quantity from a signal based on a physical quantity output by a physical quantity signal output apparatus. In particular, the present invention is suitably applicable to an electronic compass.

REFERENCE SIGNS LIST

1 First adaptive filter
2 Second adaptive filter
11-1, 11-2 Filter unit
12-1, 12-2 Subtractor
14-1 Adaptive mode control unit
15-1, 15-2 Filter update computing unit
20, 40, 60 Physical quantity measuring apparatus
21, 41, 61 Physical quantity signal output apparatus (detecting unit)
22, 42, 62 Physical quantity computing apparatus
31, 51 Large/small relationship determining unit
32, 52 First filter coefficient output unit
33, 53, 73 Correction signal output unit
54 Difference value calculating unit
55 Second filter coefficient output unit
56 Filter coefficient selecting unit
63 Control unit
72 Memory unit
71 Computing unit
71a Fluctuation estimating unit
71b Filter coefficient output unit

The invention claimed is:
1. A geomagnetic sensor comprising:
a detecting unit that detects a magnetism and outputs a geomagnetic sensor signal, on which noises are superimposed; and
a computing apparatus that computes the magnetism from the geomagnetic sensor signal,
wherein the computing apparatus comprises:
a memory unit that stores the geomagnetic sensor signal detected by the detecting unit;
a fluctuation estimating unit that estimates a fluctuation in the geomagnetic sensor signal detected by the detecting unit; and
a filter coefficient output unit which sets a filter coefficient based on the fluctuation estimated by the fluctuation estimating unit, and which outputs the filter coefficient,
wherein the fluctuation estimating unit comprises:
a first fluctuation estimating unit that estimates a first fluctuation in the geomagnetic sensor signal based on a distribution of geomagnetic sensor signals obtained at multiple measurements at different timings by the detecting unit; and a second fluctuation estimating unit that estimates a second fluctuation in the geomagnetic sensor signal based on relation between the geomagnetic sensor signal obtained at a given measurement time by the detecting unit and a first corrected geomagnetic sensor signal obtained at a measurement time close to the given measurement time, both of the geomagnetic sensor signal and the first corrected geomagnetic sensor signal being stored in the memory unit, wherein the filter coefficient output unit comprises:
a first filter coefficient output unit that outputs a first filter coefficient based on the first fluctuation;
a second filter coefficient output unit that outputs a second filter coefficient based on the second fluctuation; and
a filter coefficient selecting unit that selects either one of the first and second filter coefficients as the filter coefficient,
wherein the computing apparatus further comprises a correction signal output unit that outputs a second corrected geomagnetic sensor signal, in which the noises and delay to the geomagnetic sensor signal have been reduced, based on the filter coefficient, the geomagnetic sensor signal, and the first corrected geomagnetic sensor signal.

2. The geomagnetic sensor according to claim 1, wherein the second fluctuation estimating unit comprises a fluctuation determining unit that determines whether or not the second fluctuation in the geomagnetic sensor signal is smaller than a predetermined threshold, and
the first fluctuation estimating unit estimates the first fluctuation based on a determination result by the fluctuation determining unit.

3. The geomagnetic sensor according to claim 1, wherein the computing apparatus comprises a magnetism measuring element that outputs the geomagnetic sensor signal necessary for measuring a target magnetism.

4. The geomagnetic sensor of claim 1, wherein the detecting unit that detects a magnetism includes a hall element or a magnetoresistance effect element.

5. A geomagnetic sensor comprising:
a detecting unit that detects a magnetism and outputs a geomagnetic sensor signal, on which noises are superimposed; and
a computing apparatus that computes the magnetism from the geomagnetic sensor signal,
wherein the computing apparatus comprises:
a memory unit that stores the sensor signal;
a fluctuation estimating unit that estimates a fluctuation in the geomagnetic sensor signal detected by the detecting unit; and
a filter coefficient output unit which sets a filter coefficient based on the fluctuation estimated by the fluctuation estimating unit, and which outputs the filter coefficient,
wherein the fluctuation estimating unit comprises a large/small relationship determining unit that determines a large/small relationship between the geomagnetic sensor signal obtained at a given measurement time and a first corrected geomagnetic sensor signals obtained before the given measurement time, and
the filter coefficient output unit comprises a first filter coefficient output unit that outputs a first filter coefficient based on the plural large/small relationships,
wherein the filter coefficient output unit further comprises:

a second filter coefficient output unit that outputs a second filter coefficient based on the difference value calculated by the difference value calculating unit; and
a filter coefficient selecting unit that selects either one of the first and second filter coefficients as the filter coefficient,
wherein the computing apparatus further comprises a correction signal output unit that outputs a second corrected geomagnetic sensor signal, in which the noises and delay to the magnetic sensor signal have been reduced, based on the geomagnetic sensor signal, the first corrected geomagnetic sensor signal, and the filter coefficient.

6. The geomagnetic sensor according to claim 5, further comprising:
a difference value calculating unit that calculates a difference value between the geomagnetic sensor signal obtained at a given measurement time and the first corrected geomagnetic sensor signal obtained before the given measurement time or a difference value between different corrected geomagnetic sensor signals obtained at different timings from each other and obtained before the given measurement time.

7. The geomagnetic sensor according to claim 5, wherein when in a desired cycle, the large/small relationship between the geomagnetic sensor signal and the first corrected geomagnetic sensor signal is relatively deviated to either large or small, the first filter coefficient output unit outputs, as the first filter coefficient, a coefficient that increases a contribution of the sensor signal to the second corrected geomagnetic sensor signal, and
when there is no relative deviation in the large/small relationship between the geomagnetic sensor signal and the first corrected geomagnetic sensor signal, the first filter coefficient output unit outputs, as the first filter coefficient, a coefficient that increases a contribution of the first corrected geomagnetic sensor signal to the second corrected geomagnetic sensor signal.

8. The geomagnetic sensor according to claim 6, wherein the second filter coefficient output unit outputs the second filter coefficient based on a difference value between the geomagnetic sensor signal obtained at a given measurement time and the first corrected geomagnetic sensor signal obtained right before the given measurement time, and a difference value between the geomagnetic sensor signal obtained at the given measurement time and a corrected geomagnetic sensor signal obtained two time points before the given measurement time.

9. The geomagnetic sensor according to claim 6, wherein when the difference value between the geomagnetic sensor signal and the first corrected geomagnetic sensor signal or the difference value between the different corrected geomagnetic sensor signals from each other is relatively large, the second filter coefficient output unit outputs, as the second filter coefficient, a coefficient that increases a contribution of the geomagnetic sensor signal to the second corrected geomagnetic sensor signal, and
when the difference value between the geomagnetic sensor signal and the first corrected geomagnetic sensor signal or the difference value between the different corrected geomagnetic sensor signals from each other is relatively small, the second filter coefficient output unit outputs, as the second filter coefficient, a coefficient that increases a contribution of the first corrected geomagnetic sensor signal to the second corrected geomagnetic sensor signal.

10. The geomagnetic sensor according to claim 5, wherein the filter coefficient selecting unit selects either one of the first and second filter coefficients that further increases the contribution of the geomagnetic sensor signal to the second corrected geomagnetic sensor signal.

11. The geomagnetic sensor according to claim 5, wherein the correction signal output unit outputs the second corrected geomagnetic sensor signal through a relational expression indicated by a formula (1):

$$Snew = a \times Sin + (1-a) \times Sold \quad (1),\text{ and}$$

the filter coefficient selecting unit selects the filter coefficient through a relational expression indicated by a formula (2):

$$a = \max(a1, a2) \quad (2)$$

where Snew is the second corrected geomagnetic sensor signal, Sin is the geomagnetic signal based on the magnetism, Sold is the first corrected geomagnetic sensor signal, a is a coefficient selected by the filter coefficient selecting unit, a1 is the first filter coefficient, and a2 is the second filter coefficient.

12. A method of reducing noises and delay from a geomagnetic sensor signal output by a geomagnetic sensor, the method comprising:
 a detection step for detecting a magnetism and outputting the geomagnetic sensor signal, on which the noises are superimposed, using a detecting unit;
 a storing step for storing digital values of the geomagnetic sensor signal using a memory unit;
 a first fluctuation estimating step for estimating a first fluctuation in the geomagnetic sensor signal detected in the detection step through a fluctuation estimating unit, based on a distribution of geomagnetic sensor signals obtained at multiple measurement at different timings;
 a second fluctuation estimating step for estimating a second fluctuation in the geomagnetic sensor signal based on relation between a geomagnetic sensor signal obtained at a given measurement time and a first corrected geomagnetic sensor signal obtained at a measurement time close to the given measurement time, both of the geomagnetic sensor and the first corrected geomagnetic sensor signal being stored in the memory unit;
 a filter coefficient output step for setting a filter coefficient based on the first fluctuation or the second fluctuation, and outputting the filter coefficient through a filter coefficient output unit; and
 a correction signal output step for outputting a second corrected geomagnetic sensor signal through a correction signal output unit, based on the filter coefficient output through the filter coefficient output step and both of the geomagnetic sensor signal and the first corrected geomagnetic sensor signal stored in the memory unit,
 wherein the filter coefficient output step comprises:
  a first filter coefficient output step for outputting a first filter coefficient based on the first fluctuation;
  a second filter coefficient output step for outputting a second filter coefficient based on the second fluctuation; and
  a filter coefficient selecting step for selecting either one of the first and second filter coefficients as the filter coefficient, and wherein the second corrected geomagnetic sensor signal has reduced delay relative to the geomagnetic sensor signal.

13. The method according to claim 12, wherein
the second fluctuation estimating step comprises a fluctuation determining step for determining whether or not the fluctuation in the geomagnetic sensor signal is smaller than a predetermined threshold, and
the first fluctuation estimating step estimates the fluctuation in the geomagnetic sensor signal based on the distribution of the geomagnetic sensor signals obtained at the multiple measurements at different timings and based on a determination result through the fluctuation determining step.

14. The method according to claim 12, wherein the filter coefficient selecting step is a step for selecting either one of the first and second filter coefficients that further increases the contribution of the geomagnetic sensor signal to the second corrected geomagnetic sensor signal.

15. The method according to claim 12, wherein
the correction signal output step is a step for outputting the second corrected geomagnetic sensor signal through a relational expression indicated by a formula (3):

$$S_{new} = a \times S_{in} + (1-a) \times S_{old} \quad (3),\text{ and}$$

the filter coefficient selecting step is a step for selecting the filter coefficient through a relational expression indicated by a formula (4):

$$a = \max(a1, a2) \quad (4)$$

where $S_{new}$ is the second corrected geomagnetic signal, $S_{in}$ is the geomagnetic signal based on the magnetism, $S_{old}$ is first corrected geomagnetic sensor signal, a is a coefficient selected by the filter coefficient selecting unit, a1 is the first filter coefficient, and a2 is the second filter coefficient.

16. A method of reducing noises and delay from a geomagnetic sensor signal output by a geomagnetic sensor, the method comprising:
 a detection step for detecting a magnetism and converting the detected magnetism into the geomagnetic sensor signal, on which the noises are superimposed, using a detecting, unit;
 a storing step for storing digital values of the geomagnetic sensor signal using a memory unit;
 a fluctuation estimating step for estimating a fluctuation in the geomagnetic sensor signal detected in the detection step through a fluctuation estimating unit; and
 a filter coefficient output step for setting a filter coefficient based on the fluctuation in the geomagnetic sensor signal estimated in the fluctuation estimating step, and outputting the filter coefficient through a filter coefficient output unit,
 wherein the fluctuation estimating step comprises a large/small relationship determining step for determining a large/small relationship between the geomagnetic sensor signal obtained at a given measurement time and a first corrected geomagnetic sensor signals obtained before the given measurement time,
 wherein the filter coefficient output step comprises:
  a first filter coefficient output step for outputting a first filter coefficient based on the plural large/small relationships,
  a second filter coefficient output step for outputting a second filter coefficient based on the difference value; and a filter coefficient selecting step for selecting either one of the first and second filter coefficients as the filter coefficient to obtain the filter coefficient, wherein the method further comprises a correction signal output step for outputting a second corrected geomagnetic sensor signal, in which the noises and delay have been reduced, through a correction signal output unit, based on the geomagnetic sensor signal, the first corrected geomagnetic sensor signal, and the filter coefficient.

17. The method according to claim 16, further comprising
a difference value calculating step for calculating a difference value between the geomagnetic sensor signal and the first corrected geomagnetic sensor signal or a difference value between different corrected geomagnetic sensor signals obtained at different timings from each other.

18. The method according to claim 16, wherein
when in a desired cycle, the large/small relationship between the geomagnetic sensor signal and the first corrected geomagnetic sensor signal is relatively deviated to either large or small, the first filter coefficient output step is a step for outputting, as the first filter coefficient, a coefficient that increases a contribution of the geomagnetic sensor signal to the second corrected geomagnetic sensor signal, and when there is no relative deviation in the large/small relationship between the geomagnetic sensor signal and the first corrected geomagnetic sensor signal, the first filter coefficient output step is a step for outputting, as the first filter coefficient, a coefficient that increases a contribution of the first corrected geomagnetic sensor signal to the second corrected geomagnetic sensor signal.

19. The method according to claim 17, wherein the second filter coefficient output step is a step for outputting the second filter coefficient based on a difference value between the geomagnetic sensor signal obtained at a given measurement time and the first corrected geomagnetic sensor signal obtained right before the given measurement time, and a difference value between the geomagnetic sensor signal obtained at the given measurement time and a corrected geomagnetic sensor signal obtained two time points before the given measurement time.

20. The method according to claim 17, wherein
when the difference value between the geomagnetic sensor signal and the first corrected geomagnetic sensor signal or the difference value between the corrected geomagnetic sensor signals from each other is relatively large, the second filter coefficient output step is a step for outputting, as the second filter coefficient, a coefficient that increases a contribution of the geomagnetic sensor signal to the new corrected geomagnetic sensor signal, and when the difference value between the geomagnetic sensor signal and the corrected geomagnetic sensor signal or the difference value between the different corrected geomagnetic sensor signals from each other is relatively small, the second filter coefficient output step is a step for outputting, as the second filter coefficient, a coefficient that increases a contribution of the first corrected geomagnetic sensor signal to the second corrected geomagnetic sensor signal.

* * * * *